United States Patent
Ippatapu

(10) Patent No.: US 12,204,781 B2
(45) Date of Patent: Jan. 21, 2025

(54) SYSTEM AND METHOD FOR PERFORMANCE BASED DYNAMIC OPTIMAL BLOCK SIZE DATA DEDUPLICATION

(71) Applicant: DELL PRODUCTS, LP, Round Rock, TX (US)

(72) Inventor: Venkata L R Ippatapu, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 926 days.

(21) Appl. No.: 16/408,919

(22) Filed: May 10, 2019

(65) Prior Publication Data

US 2020/0356292 A1 Nov. 12, 2020

(51) Int. Cl.
G06F 3/06 (2006.01)
G06F 11/34 (2006.01)
G06N 5/02 (2023.01)
G06N 5/025 (2023.01)
G06N 20/00 (2019.01)
H04L 43/0829 (2022.01)
H04L 43/0864 (2022.01)

(52) U.S. Cl.
CPC .......... *G06F 3/0641* (2013.01); *G06F 3/0608* (2013.01); *G06F 3/061* (2013.01); *G06F 3/0619* (2013.01); *G06F 3/0673* (2013.01); *G06F 11/3495* (2013.01); *G06N 5/025* (2013.01); *G06N 20/00* (2019.01); *H04L 43/0829* (2013.01); *H04L 43/0864* (2013.01)

(58) Field of Classification Search
CPC ...... G06F 3/0641; G06F 3/0608; G06F 3/061; G06F 3/0619; G06F 3/0673; G06F 11/3495; G06N 5/025; H04L 43/0829
USPC .................................................. 707/692, 662
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 8,856,335 B1 * | 10/2014 | Yadwadkar | G06F 9/465 709/226 |
| 9,122,739 B1 * | 9/2015 | Yadwadkar | G06F 16/21 |
| 10,025,843 B1 * | 7/2018 | Meiri | G06F 11/2058 |
| 10,027,547 B1 * | 7/2018 | Weller | G06F 11/1464 |
| 10,095,425 B1 * | 10/2018 | Martin | G06F 3/0665 |
| 2006/0031485 A1 | 2/2006 | Veprinsky et al. | |

(Continued)

OTHER PUBLICATIONS

U.S. Appl. No. 15/794,613, filed Oct. 26, 2017 (109682.01).

*Primary Examiner* — Hosain T Alam
*Assistant Examiner* — Nicholas E Allen
(74) *Attorney, Agent, or Firm* — Larson Newman, LLP

(57) ABSTRACT

A data storage system receives input/output (I/O) data, and collects performance data of a network associated with the data storage system. The performance data is analyzed to determine network behavior based on performance metrics by applying a rules-based machine learning algorithm. The system determines a rank associated with the network behavior based on the analyzing, and determines an optimal data block size based on the rank. The system also deduplicates the I/O data, including partitioning the I/O data into data blocks of optimal data block size.

20 Claims, 10 Drawing Sheets

(56) References Cited

U.S. PATENT DOCUMENTS

| | | | |
|---|---|---|---|
| 2009/0063528 A1* | 3/2009 | Yueh | G06F 3/0608 |
| 2009/0063795 A1* | 3/2009 | Yueh | G06F 3/0641 711/162 |
| 2010/0333116 A1* | 12/2010 | Prahlad | G06F 3/0649 713/153 |
| 2013/0054544 A1* | 2/2013 | Li | G06F 16/1752 707/693 |
| 2013/0117515 A1* | 5/2013 | Ashmore | G06F 3/0685 711/162 |
| 2013/0173560 A1* | 7/2013 | McNeill | G06F 16/215 707/E17.005 |
| 2014/0095439 A1* | 4/2014 | Ram | G06F 3/0671 707/640 |
| 2014/0258244 A1* | 9/2014 | Rao | G06F 16/122 707/692 |
| 2014/0281258 A1* | 9/2014 | Callaway | G06F 12/0855 711/135 |
| 2015/0372910 A1* | 12/2015 | Janakiraman | H04L 45/74 370/392 |
| 2016/0078245 A1* | 3/2016 | Amarendran | G06N 20/00 713/193 |
| 2016/0092312 A1* | 3/2016 | Dornquast | G06F 16/1844 707/692 |
| 2016/0306560 A1* | 10/2016 | Maranna | G06F 3/067 |
| 2016/0335188 A1 | 11/2016 | Romanovskiy | |
| 2016/0359872 A1* | 12/2016 | Yadav | H04L 63/1425 |
| 2017/0060918 A1* | 3/2017 | Iyer | G06F 16/185 |
| 2017/0116229 A1* | 4/2017 | Harnik | G06F 3/0641 |
| 2017/0147599 A1* | 5/2017 | Aronovich | G06F 3/0608 |
| 2017/0168903 A1* | 6/2017 | Dornemann | G06F 9/45558 |
| 2017/0177266 A1* | 6/2017 | Doerner | G06F 12/0261 |
| 2017/0286443 A1* | 10/2017 | Ram | G06F 11/1453 |
| 2017/0324813 A1* | 11/2017 | Jain | H04L 67/1097 |
| 2017/0366606 A1* | 12/2017 | Ben-Shaul | G06F 3/064 |
| 2018/0107838 A1* | 4/2018 | Amarendran | G06F 21/6245 |
| 2018/0196830 A1* | 7/2018 | Maybee | H04L 67/1097 |
| 2018/0210667 A1* | 7/2018 | Matsumura | G06F 3/0643 |
| 2018/0211140 A1* | 7/2018 | Davis | G06K 9/6256 |
| 2018/0276237 A1* | 9/2018 | Lowry | G06F 16/24532 |
| 2018/0351816 A1* | 12/2018 | Li | H04L 67/10 |
| 2019/0014055 A1* | 1/2019 | Gupta | H04L 49/9084 |
| 2019/0065788 A1* | 2/2019 | Vijayasankar | G06F 21/64 |
| 2019/0073152 A1* | 3/2019 | Nagle | G06F 3/067 |
| 2019/0108341 A1* | 4/2019 | Bedhapudi | G06F 16/1752 |
| 2019/0121673 A1* | 4/2019 | Gold | G06T 1/20 |

* cited by examiner

| Metric 635 | Value 640 | Rank 645 | Level 650 |
|---|---|---|---|
| Packet Loss and Re-transmissions 655 | Re-transmits > Re-transmits_threshold | 0 | 1 |
| RTT 660 | 0 < RTT < A | 1 | 4 |
| 665 | A < RTT < B | 2 | 3 |
| 670 | B < RTT < C | 3 | 2 |
| 675 | RTT > C | 4 | 1 |
| No Packet Loss and RTT = 0 680 | Throughput <= Available Bandwidth | 5 | 5 |

700 ↘

705 ┐

| Metric 710 | Value 715 | Rank 725 | Level 730 |
|---|---|---|---|
| Performance Category 1 735 | Value > Threshold | Rank N - 5 | Level 1 |
| Performance Category 2 740 | 0 < Performance Category 2 < X | Rank N - 4 | Level N - 1 |
| 745 | X < Performance Category 2 < Y | Rank N - 3 | Level N - 2 |
| 750 | Y < Performance Category 2 < Z | Rank N - 2 | Level N - 3 |
| 755 | Performance Category 2 > Z | Rank N - 1 | Level N - 4 |
| Performance Category 3 760 | A <= B | Rank N | Level N |

Legend
N = 5

| Level 760 | Block Size 765 |
|---|---|
| Data Deduplication Level 1 770 | X/16 Bytes |
| Data Deduplication Level 2 775 | X/8 Bytes |
| Data Deduplication Level 3 780 | X/4 Bytes |
| Data Deduplication Level n − 1 785 | X/2 Bytes |
| Data Deduplication Level n 790 | X Bytes |

SYSTEM AND METHOD FOR PERFORMANCE BASED DYNAMIC OPTIMAL BLOCK SIZE DATA DEDUPLICATION

FIELD OF THE DISCLOSURE

The present disclosure generally relates to information handling systems, and more particularly relates to performance based dynamic optimal block size data deduplication.

BACKGROUND

Computer systems may include different resources used by one or more host processors. Resources and host processors in a computer system may be interconnected by one or more communication connections. These resources may include, for example, data storage devices such as those included in the data storage systems manufactured by Dell EMC®. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using a data storage system. For example, a host processor may perform basic system input/output (I/O) operations in connection with data requests, such as data read and write operations.

Host systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts, and other components may be interconnected by one or more communication connections such as in a network configuration. The network may support transmissions in accordance with well-known protocols such as Transmission Control Protocol/Internet Protocol (TCP/IP), User Datagram Protocol (UDP), and the like. Networked storage systems, such as data storage arrays, may be used to maintain data on different systems in different locations. For example, in some implementations, a local or source data site may be configured in a partner relationship with a remote or destination source data site. The remote data site includes a mirror or copy of the data in the local data site. Such mirroring may be used for a variety of reasons including reducing the likelihood of data loss. Mirroring is a form of replication, in which data on the first storage device is replicated on the second storage device.

The time it takes to perform data replication depends in part on the time it takes to transmit the data being replicated between the primary data site and remote data site, and the time it takes to transmit the data being replicated depends in part on the size of the data.

SUMMARY

A data storage system may receive I/O data, and collect performance data of a network associated with the data storage system. The performance data is analyzed to determine network behavior based on performance metrics by applying a rules-based machine learning algorithm. The system determines a rank associated with the network behavior based on the analyzing, and determines an optimal data block size based on the rank. The system also deduplicates the I/O data, including partitioning the I/O data into data blocks of optimal data block size.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 7A is a table showing an evaluation of a network behavior according to at least one embodiment of the present disclosure;

FIG. 7B shows an example tabulation of deduplication levels and respective data block sizes according to at least one embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
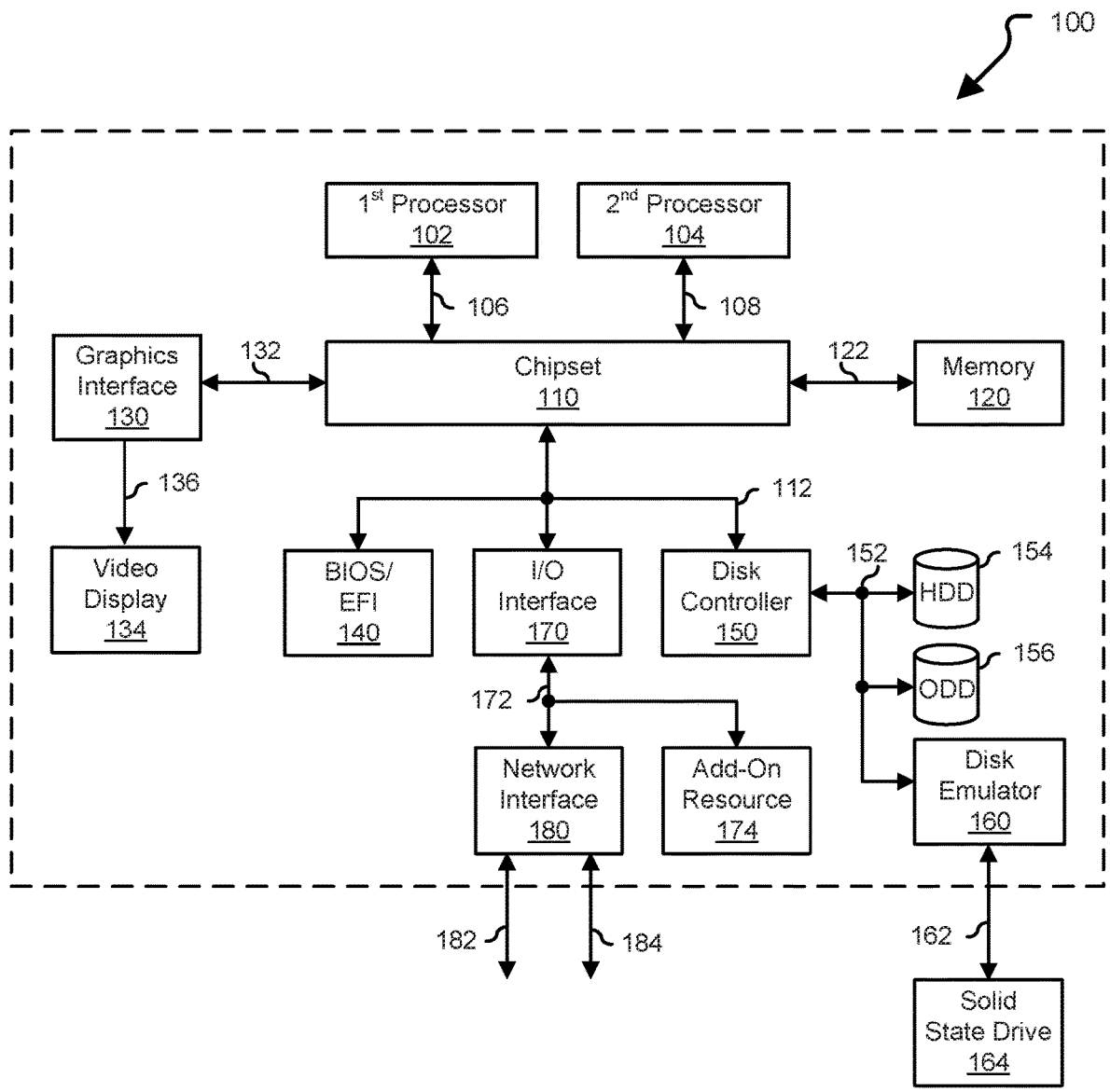
FIG. 1 is a block diagram of an information handling system according to at least one embodiment of the present disclosure.

FIG. 1 illustrates a generalized embodiment of information handling system 100. For purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various I/O devices, such as a keyboard, a mouse, and a video display. Information handling system 100 can also include one or more buses operable to transmit information between the various hardware components.

Information handling system 100 includes processors 102 and 104, a chipset 110, a memory 120, a graphics interface 130, include a basic input and output (I/O) system/extensible firmware interface (BIOS/EFI) module 140, a disk controller 150, a disk emulator 160, an I/O interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132 and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read-only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, an small computer system interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, an SCSI interface, a USB interface, a proprietary interface, or a combination thereof. Disk emulator 160 permits a solid-state drive 164 to be connected to information handling system 100 via an external interface 162. An example of external interface 162 includes a universal serial bus (USB) interface, an Institute of Electrical and Electronics Engineers (IEEE) 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface 180 includes network channels 182 and 184 that provide interfaces to devices that are external to information handling system 100. In a particular embodiment, network channels 182 and 184 are of a different type than peripheral interface 172 and network interface 180 translates information from a format suitable to the peripheral channel to a format suitable to external devices. An example of network channels 182 and

184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Conventional data deduplication process generally utilizes a single static data block size irrespective of the behavior of the network and/or its resources. Exemplary embodiments provide a fully automated solution that collects and analyzes performance data via machine learning to optimize the data deduplication process based on the current behavior of the network and/or its resources. The machine learning may be expressed in rules, decision trees, etc. that analyzes the collected data and predict an output value. The rules may be sequentially, parallel, or batch processed to determine the optimal data block size. The rule may specify which internal hardware and/or software component is required for the performance data. The rule may further specify performance metrics to be evaluated based on the performance data. As used herein, a performance metric measures the behavior and performance of the data storage system, its network, and resources such as hardware and software components. For example, the performance metric assesses how well the network is currently performing. Based on the assessment, a deduplication level may be determined to identify an optimal data block size for the data deduplication.

In some embodiments, the deduplicated I/O data may be compressed and the compressed deduplicated I/O data transmitted to a second (e.g., remote) storage system as part or replicating the I/O data. Reduced I/O data is I/O data that has at least been deduplicated, and for which the deduplicated I/O data may have been compressed. Compressing the deduplicated I/O data will further reduce the I/O data size, resulting in even faster storage times and less network bandwidth consumption.

Examples of embodiments of the invention will now be described in more detail with reference to the drawings. It should be appreciated that these examples are for illustrative purposes and the invention is not so limited, as different I/O data sizes, data block sizes, performance ranks, and deduplication levels may be used and fall within the scope of the invention.

Figure 2:
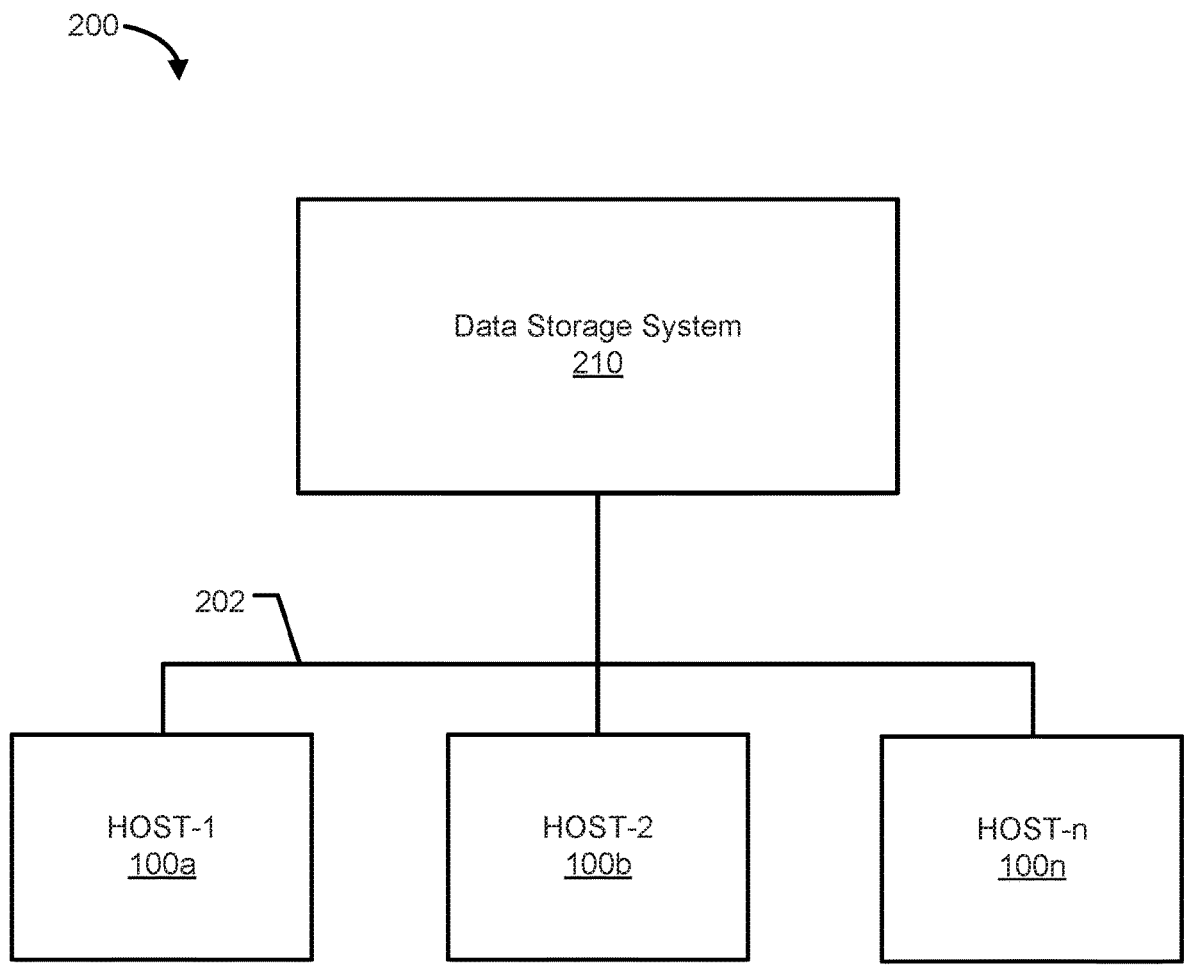
FIG. 2 is an example of an embodiment of a computer system, according to at least one embodiment of the present disclosure.

FIG. 2 shows a computer system 200 for dynamically determining an optimal data deduplication level. The optimal data deduplication level identifies an optimal data block size for the data deduplication and replication. The data deduplication is a specialized technique for eliminating duplicate copies of repeating data. The data deduplication may be performed on I/O data which may be divided into blocks of a determined size (64 bytes, 128 bytes, 264 bytes, 512 bytes, 1024 bytes, etc.). The data blocks may be ordered, for example, in an order corresponding to the order of the bits of the I/O data grouped into the blocks. The data deduplication is performed on the data blocks by comparing each data block to the other data blocks (in a defined order) in the I/O data to determine if there is a match. These comparisons may involve calculating (if one is not provided in the I/O data) and/or comparing fingerprints, for example, cyclic redundancy check (CRC) values, of each block. If a duplicate data block (that is, a match) is determined for a data block, the duplicate data block may be identified with a reference relative to the position of the duplicate data block within the I/O data.

Because of an issue of increasing demand and necessity to reduce network bandwidth and usage, a solution that reduces network bandwidth usage and at the same time replicates as much host data as possible is needed. Given that the same byte pattern may occur dozens, hundreds, or even thousands of times, the amount of data that must be stored or transferred can be greatly reduced. The number of times the same byte pattern occurs may also be referred to as a match frequency. The match frequency may depend at least in part on the size of the byte pattern also referred to as chunk size or data block size. Determining the optimal data block size is important in getting an efficient data deduplication ratio and throughput. If the data block size is too large, then it reduces the exploitable redundancy in I/O data. If the data block size is too small, the I/O data becomes highly fragmented resulting in additional data overhead further congesting the network without any considerable data reduction.

Described herein are systems and techniques for determining the optimal data block size for data deduplication on the I/O data received from a host to a storage system, for example, as part of replicating the data at another storage system, whether inline or post-process. The data storage system executes an artificial intelligence scheme for autonomously optimizing the data deduplication process by determining the optimal data block size. The intelligent and dynamic approach of determining the optimal data block size to use in partitioning the I/O data maximizes the reduction of the I/O data in comparison to typical data deduplication. For example, the current disclosure has remarkable superiority in reducing data length and increasing data savings ratio. The data savings ratio may be calculated from the size of I/O data divided by the size of deduplicated data.

The computer system 200 includes a data storage system 210 connected to information handling systems also referred to as hosts 100*a*-100*n* through a communication medium 202. Other embodiments of data storage system 210 are possible and are intended to fall within the scope of the disclosure. Data storage system 210 of FIG. 2 may contain one or more interconnected data storage systems which may be manufactured by one or more different vendors. Each of the interconnected data storage systems may be resources included in an embodiment of the computer system 200 of FIG. 2 to provide storage services to, for example, hosts 100*a*-100*n*.

In this embodiment of the computer system 200, the N hosts 100*a*-100*n* may access data storage system 210, for example, in performing I/O operations or data requests through the communication medium 202. The processors included in hosts 100*a*-100*n* may be any one of a variety of proprietary or commercially available single or multi-processor system, such as an Intel-based processor, or another type of commercially available processor able to support traffic in accordance with each particular embodiment and application.

The communication medium 202 may use any one or more of a variety of networks or another type of communication connection as known to those skilled in the art. The type of communication connection used may vary with certain system parameters and requirements, such as those related to bandwidth and throughput required in accordance with a rate of data requests as may be issued by hosts 100*a*-100*n*. The communication connection may be a network connection, bus, and/or another type of data links, such as a hardwire or other connections known in the art. For example, the communication medium 202 may use the internet, an intranet, network or other wireless or other hardwired connection(s) by which hosts 100a-100n may access and communicate with the data storage system 210, and also may communicate with data storage systems that may be included in the computer system 200.

The communication medium 202 may use a variety of different communication protocols such as SCSI, enterprise systems connection (ESCON), Fibre Channel, internet small computer system interface (iSCSI), or Gigabit Ethernet (GigE), and the like. Some or all of the connections by which hosts 100a-100n and the data storage system 210 may be connected to the communication medium 202 may pass through other communication devices, such as switching equipment, a phone line, a repeater, a multiplexer or even a satellite.

Each of hosts 100a-100n and the data storage system 210 may all be located at the same physical site or may be in different physical locations. Each of hosts 100a-100n may perform different types of data operations in accordance with different tasks and applications executing on hosts 100a-100n. In the embodiment of FIG. 1, any one of hosts 100a-100n may issue a data request to the data storage system 210 to perform a data operation. For example, an application executing on one of hosts 100a-100n may perform a read or write operation resulting in one or more data requests to the data storage system 210.

The data storage system 210 may be an inline or post-process data deduplication system. The data storage system 210 may include one or more data storage systems. Each of the data storage systems may include a plurality of physical non-volatile storage devices arranged in n rows of disks or volumes. Each row of disks or volumes may be connected to a disk adapter (DA) or director responsible for the backend management of operations to and from a portion of the disks or volumes. A single DA may be responsible for the management of a row of disks or volumes. The data storage systems may also include one or more host adapters (HAs) or directors to manage communications and data operations between one or more host systems and global memory. In an embodiment, the HA may be a Fibre Channel Adapter or another adapter which facilitates host communication.

The data storage systems may also have a remote adapter (RA) including a processor used to facilitate communication between data storage systems, such as between two of the same or different types of data storage systems. In one embodiment, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix data storage systems. The RA may be used with Symmetrix Remote Data Facility (SRDF), a family of products (provided by Dell EMC, a division of Dell Inc.) that facilitate the data replication from one Symmetrix storage array to another through a storage area network or an IP network. SRDF logically pairs a device or a group of devices from each array and replicates data from one to the other synchronously or asynchronously. Performing remote data communications using SRDF over a TCP/IP network is described in more detail in U.S. Pat. No. 6,968,369 to Veprinsky entitled "Remote Data Facility Over an IP Network," which is incorporated by reference herein. Generally, the SRDF products are one example of commercially available products that may be used to provide the functionality of remote data storage for use in an embodiment in connection with techniques herein. Data storage device communication between Symmetrix data storage systems using SRDF is described, for example, in U.S. Pat. No. 5,742,792 to Yanai entitled "Remote Data Mirroring," U.S. Pat. No. 5,544,347 to Yanai entitled "Data Storage System Controlled Remote Data Mirroring with Respectively Maintained Data Indices," and U.S. Pat. No. 7,054,883 to Meiri entitled "Virtual Ordered Writes for Multiple Storage Devices," all of which are incorporated by reference herein.

One or more internal logical communication paths may exist between DAs, the RAs, the HAs, and the memory. An embodiment may use one or more internal busses and/or communication modules. For example, the global memory portion may be used to facilitate data transfers and other communications between the DAs, HAs and RAs in a data storage system. In one embodiment, the DAs may perform data operations using a cache that may be included in the global memory, for example in communications with other DAs or directors, and other components of the data storage system. The other portion is that portion of memory that may be used in connection with other designations that may vary in accordance with each embodiment.

Data storage devices may be any suitable storage devices such as rotating disk drives, flash-based storage, and the like. The particular data storage system as described in this embodiment, or a particular device thereof, such as a rotating disk or solid-state storage device (such as a flash-based storage device), should not be construed as a limitation. Other types of commercially available data storage systems, as well as processors and hardware controlling access to these particular devices, may also be included in an embodiment.

In some embodiments, write data received at the data storage system from a host or other client may be initially written to cache memory and marked as write pending. Once written to the cache memory, the host may be notified that the write operation has completed. At a later point time, the write data may be destaged from cache to the physical storage device, such as by a DA.

The HAs may be used in connection with communications between a data storage system and a host system. The RAs may be used in facilitating communications between two data storage systems. The DAs may be used in connection with facilitating communications to the associated disk drive(s) and LUN(s) residing thereon.

An embodiment of the data storage system 210 may also include the concept of an RDF group in which one or more devices on a data storage system are associated with a particular group under the control of a single RA which services the devices included therein. Rather than have a single R1 device and a single R2 device, a grouping may be defined so that a source group of devices, such as on a primary storage subsystem, have corresponding target devices of a target group, such as devices on the secondary storage subsystem. Devices in a source group may be mirrored in corresponding devices of a target group using SRDF functionality.

Data from host servers such as an information handling system 100 may be transmitted to a primary data storage system in one geographical location. The data is then copied from the primary data storage system to a secondary data storage system in another geographical location. The secondary data storage system may also be used for disaster recovery and fault tolerance. Due to the distance between the hosts, primary storage system, and secondary storage system, sometimes miles, hundreds of miles, or even thousands of miles apart, the use of Ethernet is limited at best. However, usage of wireless network such as the internet, a global network, etc. hereinafter referred to as a network has some shortcomings such as round-trip time (RTT) latency, packet drops, packet timeouts, retransmits, etc. that can degrade the performance of the data storage systems. For example, it has been observed that network latency can contribute to more than 70% of overall I/O data latency.

Generally, data is reduced and/or compressed prior to transmitting to the network without considering the underlying network. However, data reduction without considering the behavior of the network such as the RTT latency, available bandwidth, etc. may result in a deterioration of the overall performance because of the additional overhead in the data processing. The current disclosure proposes to monitor and analyze various performance metrics and then to leverage results of the analysis in determining an optimal data reduction and/or compression method without compromising the overall performance of the data storage system.

Figure 3:
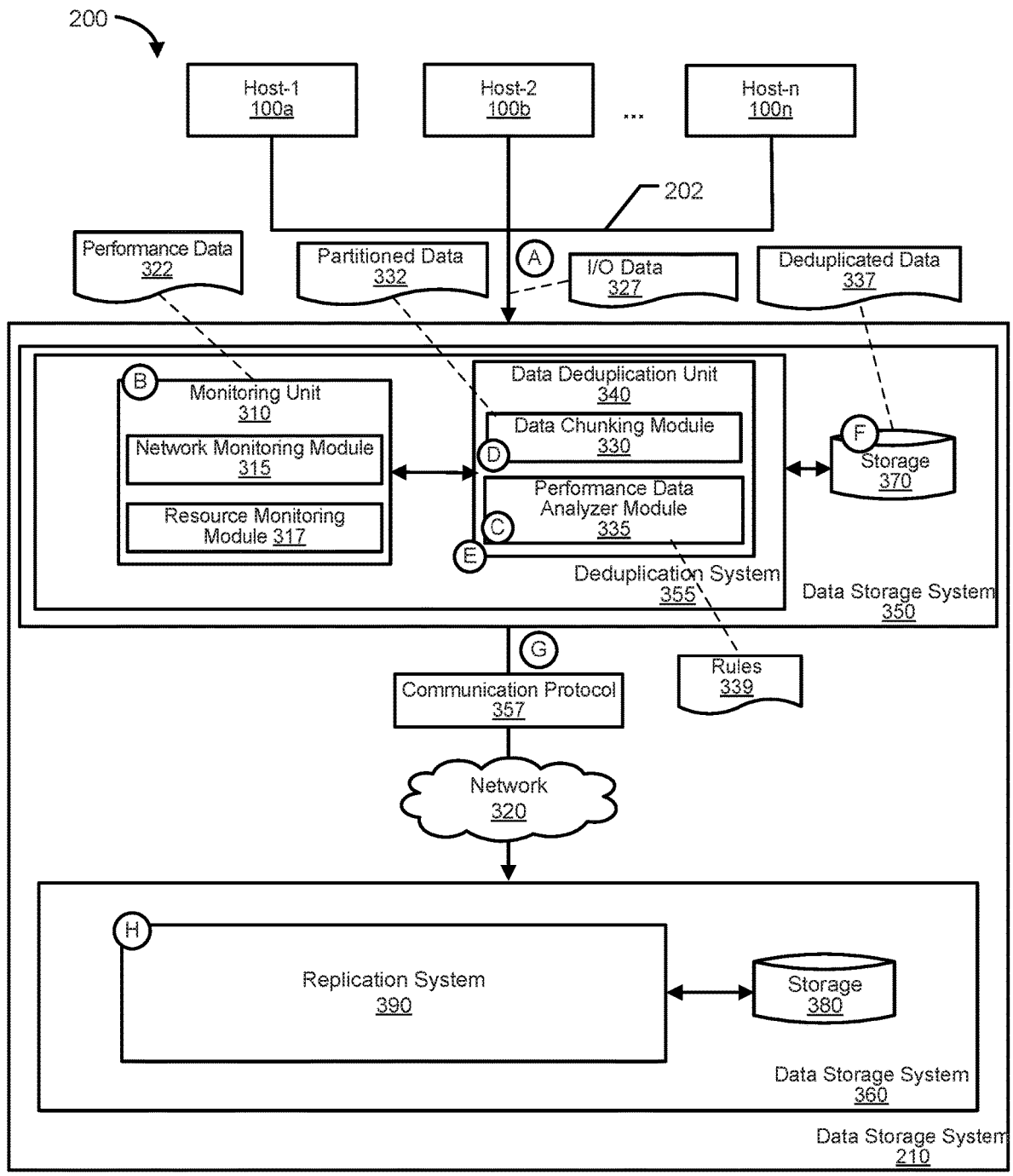
FIG. 3 is a more detailed illustration of the computer system, according to at least one embodiment of the present disclosure.

FIG. 3 shows the computer system 200 in greater detail. Computer system 200 includes data storage system 210 and hosts 100a-100n connected through the communication medium 202. Data storage system 210 includes data storage system 350 and data storage system 360 connected through a network 320 which includes a Communication protocol 357. Communication protocol 357 provides end-to-end data communication specifying how data should be packetized, addressed, transmitted, routed, and received over network 320. Data storage system 350 includes a deduplication system 355 and a storage device 370. Deduplication system 355 includes a monitoring unit 310 and a data deduplication unit 340. Monitoring units/modules may also be referred to as watchdog units/modules. Monitoring unit 310 includes a network monitoring module 315, and a resource monitoring module 317. Data deduplication unit 340 includes a data chunking module 330 and a performance data analyzer module 335. Monitoring unit 310 and data deduplication unit 340 may also be implemented as a single unit. Data storage system 360 includes a replication system 390 and a storage device 380. Storage devices 370 and 380 may include solid state disks, hard disk drives, magnetic tape libraries, optical disk drives, magneto-optical disk drives, compact disk drives, compact disk arrays, disk array controllers, and/or any computer-readable medium operable to store data.

Each of hosts 100a-100n may be a server device such as enterprise server, application server, email server, web server, content server, application server, etc. Alternatively, hosts 100-100n may be a client device such as a desktop computer, a tablet, a smartphone, etc. In some arrangements, hosts 100a-100n may include both server devices and client devices. Hosts 100a-100n may access data storage system 210, for example, in performing I/O operations through network 320. I/O operations may also be referred to as I/O requests or I/O data requests. The processors included in hosts 100a-100n may be any one of a variety of proprietary or commercially available single or multi-processor system, such as an Intel-based processor, or another type of commercially available processor able to support traffic in accordance with each particular embodiment and application.

Network 320 may use any one or more of a variety of networks or another type of communication connection as known to those skilled in the art. The type of communication connection used may vary with certain system parameters and requirements, such as those related to bandwidth and throughput required in accordance with a rate of data requests as may be issued by hosts 100a-100n. The communication connection may be a network connection, bus, and/or another type of data link, such as a hardwire connection or other connections known in the art. For example, network 320 may use an internet, an intranet, or other wireless or other hardwired connection(s).

Data storage system 210 may be configured to maintain data on a local data site and a remote data site. The local data site may also be referred to as a local data storage subsystem or the primary data storage subsystem. The remote data site may also be referred to as a remote data storage subsystem or the secondary data storage subsystem. Primary storage subsystem may be in the same physical site as hosts 100a-100n. Secondary storage subsystem may be located remotely with respect to hosts 100a-100n and/or the primary storage subsystem. For example, the distance between the primary storage subsystem and secondary storage subsystem may be 200 km or more. As shown herein, data storage system 350 may be the primary storage subsystem and data storage system 360 may be the secondary storage subsystem.

Monitoring unit 310 may be configured to collect and transmit data representing at least some or a combination of data storage system 210 performance data, network 320 performance data, host 100a-100n performance data, communication medium 202 performance data, and the like. The performance data may include data storage system operating statistics, network operating statistics, and/or hosts 100a-100n operating statistics. The data may be transmitted to data deduplication unit 340 and/or stored in a storage device such as storage device 370. In particular, the data may be transmitted to performance data analyzer module 335.

Note that although one data storage system is shown, monitoring unit 310 may communicate with multiple data storage systems. It should also be noted that monitoring unit 310 may exist internal or external to the data storage system 210 and may communicate with the data storage system 2100 using any one of a variety of communication connections such as a serial port, a parallel port, and using a network interface card for example, with a network connection. Using the network connection, monitoring unit 310 may communicate directly with DAs and HAs within the data storage system 210. Monitoring unit 310 may transmit the collected performance and/or statistic data to the analyzer.

Conventional data deduplication process generally utilizes a static data block size irrespective of the behavior of the network and/or its resources. Exemplary embodiments provide a fully automated solution that collects and analyzes performance data via machine learning to optimize the data deduplication process based on the current behavior of the network and/or its resources. In this embodiment, performance data analyzer module 335 may be configured to determine the optimal data block size in which to divide I/O data 327 into data blocks based on the performance data collected by monitoring unit 310 and analysis of data deduplication unit 340. As used herein, the data block size may also be referred to as partitions, segments, or chunks.

Performance data analyzer module 335 may use machine learning in determining the optimal data block size. The machine learning may be expressed in rules, decision trees, models, etc. that analyzes the collected data. The rules may be processed sequentially, in parallel, or in batches to determine the optimal data block size. The rules may also identify which internal hardware and/or software component the performance data was collected from. The rule may further specify performance metrics to be evaluated based on the performance data. As used herein, a performance metric measures the behavior and performance of the data storage system, its network and resources.

Performance data analyzer module 335 can also calculate statistics upon detection of a triggering event. The triggering event may include receipt of the performance data, receipt of I/O data, initiation of the data deduplication and/or the data replication process, and the like. The statistics calculated based on the monitoring data may include minima, maxima, means, medians, modes, standard deviations, variances, percentages, percentiles, moments, weighted averages, a combination of the same, or the like. Another example of a statistic that can be calculated is the average maximum amount of memory consumed by the primary data storage system over a period of time. The statistics can be stored for later access or usage.

Data chunking module 335 may be configured to divide I/O data 327 based on the optimal data block sizes as identified by the optimal deduplication level. Dividing I/O data 327 may include identifying boundaries within the I/O data. A data block is data between two boundaries. It should be noted that there is an implicit boundary at a start and at an end of the I/O data. The size of each data block is referred to as the data block size or chunk size. The data savings may be calculated as equal to the number of duplicates multiplied by the data block size.

Communication protocol 357 typically includes various implementations of TCP, UDP, and real-time protocol (RTP), which was developed for streaming data across IP based networks. UDP which is typically used instead of TCP for streaming media transmissions is a one-way, connectionless protocol requiring no connection to be established prior to transmission.

FIG. 3 is annotated with a series of letters A-F. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, one of hosts 100a-100n may issue a command, such as to write I/O data 327 to data storage system 210. Data storage system 210 may write I/O data 327 in its data cache and mark as write pending prior to processing. The data cache may be a reserved memory in data storage system 210. Once written to the cache memory, the host that issued the command may be notified that the write operation has completed. At a later point time, the write data may be destaged from the data cache to the physical storage device, such as by a DA.

At stage B, data storage system 350 begins processing I/O data 327. Monitoring unit 310 may collect performance data 322 associated with hosts 100a-100n, communication medium 202, and data storage system 210 including network 320, etc. For example, performance data 322 may include statistics regarding the behavior of a processor, a network, a resource, a combination of one or more of the aforementioned, etc. Network monitoring module 315 may collect data or performance metrics regarding communication medium 202, Communication protocol 357, and network 320. Network monitoring module 315 may monitor several network performance metrics to determine overall network behavior. For example, network monitoring module 315 may monitor and calculate network performance metrics such as available bandwidth RTT, re-transmits, congestion window, current throughput, packet loss, etc. Resource monitoring module 317 may collect performance data regarding hosts 100a-100n, data storage system 350, data storage system 360, storage devices 370 and 380, and the like.

In one embodiment, performance data 322 may include deduplication and replication times of backup processes performed by data storage system 210. As used herein, "deduplication time" refers to the time it takes to complete a data deduplication operation while "replication time" refers to the time it takes to complete a data replication operation. In some embodiments, performance data 322 may also include network statistics, such as network bandwidth utilization and/or network latency. As used herein, "network bandwidth" refers to the available data communication resources over a network. Network bandwidth is expressed in terms of bits (or multiple of bits) per second such as bits/second, kilobits/second, megabits/second, gigabits/second, etc. As used herein, "network latency" refers to the time delay in the network. For example, network latency can be the time delay for a packet to propagate from/to data storage system to/from a host.

Each set of the performance data may be mapped to a hardware and/or a software component. The hardware and/or software component may be uniquely referenced using a device identifier, a network address, or an application identifier. Performance data 322 may be stored in a volatile or nonvolatile storage such as storage device 370. In one embodiment, performance data collected and/or stored prior to the performance data 322 may be referred to as historical performance data.

At stage C, performance data analyzer module 335 may determine an optimal chunk size in which to partition I/O data 327 into data blocks based on performance data 322 collected by monitoring unit 310. Performance data analyzer module 335 may perform an analysis of the performance data 322 using machine learning. As another example, performance data analyzer module 335 may use a distributed machine learning algorithm. The machine learning algorithm may include decision tree learning, association rule learning, artificial neural networks, deep learning, inductive logic programming, support vector machine (SVM), Bayesian networks, rules-based machine learning, or the like. The machine learning algorithm may identify one or more performance metrics and/or modification to the performance metrics.

Performance data analyzer module 335 may generate, execute, and/or evaluate one or more rules 339 determine the optimal data block size in which to divide the I/O data into data blocks based on analysis of performance data 322 collected by monitoring unit 310. Rules 339 may be logical statements that include performance metrics associated with performance data 322. Rules 339 may be generated based on pattern recognition of performance data 322, characteristics of I/O data 327, and/or hardware and/or software components of the data storage system such as the geographical location of the primary data storage system and the secondary data storage system. In addition, rules 339 may be updated as data deduplication and/or replication processes are performed in some embodiments. Rules 339 may be stored in a non-volatile storage such as storage device 370 and the like. Thus, performance data analyzer module 335 may retrieve rules 339 prior to its execution and/or evaluation. In one embodiment, the data deduplication level used for the persisted performance data may be stored and may also be used to determine the effectiveness of one or more applied rules and to update the one or more applied rules for future operations.

As part of the analysis, a "rules engine" may be employed to validate metrics using thresholds and patterns established earlier. The rules engine may process the collected performance data using programmable logic. Examples of a rules engine include the open source Drools® business rules management system or Microsoft® windows workflow foundation. A rules engine may be capable of loading a dynamically defined set of rules and executing them upon a given set of inputs. As a person of ordinary skill in the art will recognize in light of this disclosure, such rules engines may enable variability of the rules, operators, and operands, and cover a wide range of logic, arithmetic, pattern analysis, temporal, and other operations. Generated outputs from an executed rule may be used to synthesize a new input performance data and refactor it back into the collected performance data to be used for further analysis. The outputs may be fed to a larger data set in order to form an aggregate set of characteristics and then construct a model thus generating more meaningful averages, maximums, minimums, packet patterns, response times, etc., and the association among these characteristics.

Determining the optimal data block size is important because there generally is a tradeoff between the effectiveness of deduplication against processing overhead cost. Smaller data block sizes may result in more duplicate data blocks and more data block metadata. The data block metadata is used to track the location and mapping of the data block. As there are more data block metadata to look up and track data blocks, processing overhead may increase. Large data block sizes may result in less duplicate data blocks and less data block metadata. As there are less data block metadata to look up and track data blocks, processing overhead may decrease. By introducing the concept of determining the optimal deduplication level with different block sizes, the system dynamically determines the optimal data block size based on the current data storage system performance and network behavior. In contrast to choosing a particular fixed data block size regardless of system performance and/or network behavior thus may deteriorate the aforementioned.

The optimal data block size may be the data block size with the desired balance between a number of duplicate data blocks and processing overhead minimizing impact to the current data storage system performance and network behavior. It should be appreciated that the number of deduplication levels and the data block size chosen for each level are for illustrative purposes only and does not limit the current disclosure. A different number of deduplication levels, such as more or less than four, and different data block sizes, such as more than 512-byte data block size and less than the 64-byte data block size, may be used and fall within the scope of the current disclosure. Further, the current disclosure is not limited to data storage systems and may be implemented in applications for data reduction.

Deduplicating data using the optimal deduplication level and/or data block size may result in data savings which may translate into I/O and storage savings. With a reduction in data, there is a reduction in space to transmit and store data. Several factors may be used in determining the optimal data block size. The email server may contain many instances of the same one-megabyte (MB) file attachment, such when an email message with the one MB attachment is resent or replied to several times. In this instance, the optimal block size may be equivalent to the size of the file attachment. In another example, the I/O data may be a collection of dissertation papers from a file server. The dissertation papers generally do not have attachments that contain instances of the same data. Thus, determining the optimal data block size for the collection of dissertation papers may be different than determining the optimal data block size for the email messages with one MB attachments.

Deduplicating data using the optimal data deduplication level and/or data block size may result in better deduplication rate and data deduplication ratio. For example, if the data block size is too large, there will be fewer matches resulting in smaller data storage savings. Conversely, if the data block size is too small, there will be more data blocks to process resulting in additional overhead. An optimal data block size would result in more matches but minimal overhead resulting in greater data storage savings with less impact to the performance of the data storage system and/or the network. By considering the state of the data storage system and network during the data deduplication process, the systems and methods disclosed herein adapts to the current behavior of the system and thus minimize its impact. In other words, using the optimal data block size during data deduplication may result in maximum data reduction with minimum performance impact.

At stage D, data chunking module 330 may partition I/O data 327 into data blocks based on the optimal data block size. Each data block may be hashed using a cryptographic hash function such as message digest (MD) MD2, MD4, MD5, advanced encryption standard (AES), secure hash algorithm (SHA) SHA-0, SHA-1, SHA-2, SHA-3, SHA-256, etc. generating a fingerprint for each data block. A "fingerprint" as the term is used herein, is information derived from the content of a data block, that uniquely identifies the data block. The fingerprint may also be referred to as a unique identifier or a hash value. Using the fingerprint, each data block is then compared to the other data blocks to determine duplicates. For each duplicate, a counter respective to the current partitioned data 332 is maintained and incremented. Data chunking module 330 may also identify duplicate data blocks by setting a flag respective to each duplicate data block to one. Prior to the start of the comparison, the counter was initialized to zero. In addition, the flag may have also been initialized to zero prior to the start of the comparison. Partitioned data 332 is I/O data 327 that has been partitioned using the optimal data block size. Data chunking module 330 may transmit partitioned data 332 to data deduplication unit 340.

At stage E, data deduplication unit 340 begins processing partitioned data 332 to produce deduplicated data 337. Data deduplicating unit 340 identifies duplicate data blocks in partitioned data 332. Data deduplicating unit 340 may update metadata information with a reference to a unique instance of a first occurrence of the duplicate data block. Metadata holds information respective to the deduplicated data. This process continues until all duplicate data blocks are identified and metadata information updated.

At stage F, data storage system 350 stores the deduplicated data 337 in storage device 370. Data storage system 350 may also store metadata information along with deduplicated data 337. Data storage system 350 may also store rules 339 at storage device 370. At stage G, a copy of the deduplicated data 337 may be transmitted to data storage system 360 along with the metadata information via network 320. In this example, storage device 370 is in a different location than storage device 380 such that if storage device 370 becomes inoperable, any one of the hosts 100a-100n may resume operation using deduplicated data stored in storage device 380. For example, with Symmetrix Remote Data Facility (SRDF), a user may denote a first storage subsystem as a master storage device and a second storage subsystem as a slave storage device. Other incarnations of the SRDF may provide a peer to peer relationship between the local and remote storage systems. In one example, hosts 100a-100n may interact directly with data storage system 210, but any data changes made are automatically provided to a primary storage system using the SRDF. In operation, any one of hosts 100a-100n may read and write data using storage device 370, and the SRDF may handle the automatic copying and updating of data from storage device 370 to storage device 380.

At stage H, the replication system 390 may replicate I/O data 327. During the replication process, replication system 390 may allocate a buffer the size of the original I/O data (the I/O data 327). The replication system 390 may restore every duplicate and redundant data payload using the first occurrence of the duplicate or redundant data payload that is referenced in the metadata. This process continues until all the data blocks are restored.

Figure 4:
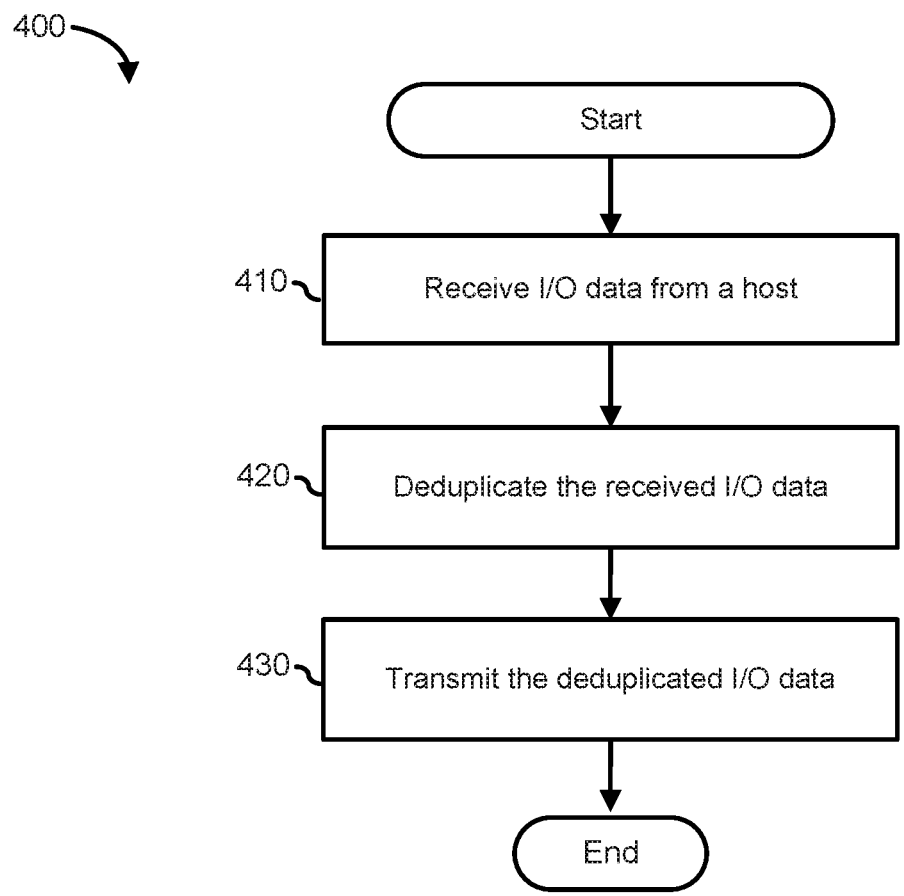
FIG. 4 is a flowchart illustrating a method for determining an optimal block size to partition I/O data into fixed-length data blocks for data deduplication according to at least one embodiment of the present disclosure.

FIG. 4 shows a method 400 of performing aspects of data deduplication and replication according to at least one embodiment of the present disclosure. Other embodiments of the method of performing aspects of data replication, for example, variations of the method 400, are possible and are intended to fall within the scope of the disclosure. Each step of method 400 or portions thereof may be performed by one or more suitable components of the systems described above in relation to FIGS. 2-3.

In block 410, I/O data may be received, for example, at a first data storage system from a host. For example, the I/O data may be received as part of an I/O data request from the host. In another embodiment, the I/O data may be retrieved by the first data storage system from the host. In block 420, the I/O data may be deduplicated, for example, as described in more detail below in relation to a method 500 described in FIG. 5. The deduplicated data may also be compressed after deduplication. The steps of deduplicating and compressing may be referred to herein a performing data reduction or reduction on the I/O data, or data-reducing or reducing the I/O data. In some embodiments, data reduction techniques described herein are performed on host I/O operations having data to be transferred from data storage system 350 to data storage system 360 as part of a replication process performed by the RDF. The replication process performed includes deduplicating identical and redundant blocks to unique instances of blocks and references to the unique blocks. The replication process may be performed in connection with egress or outbound processing of I/O data transmitted from the data storage system 350 to the data storage system 360. Data deduplication is known in the art and generally refers to removing redundant or duplicate data whereby only a single instance of the block is retained with pointers or references used in connection with duplicate or redundant copies (which reference or identify the single instance of the block). Data compression is known in the art and generally refers to data modification or conversion in such a way that the data consumes less space on a disk. For the purposes of this disclosure, reduced data is data that has been deduplicated and compressed.

In block 430, the reduced data may be transmitted to a remote data storage system. In some embodiments, the metadata header generated during the deduplication performed may be transmitted along with the reduced I/O data. In turn, the data storage system 360 receiving the deduplicated host I/O operation also performs processing to unwrap or restore the deduplicated data to its original block form on the ingress/inbound processing.

Figure 5:
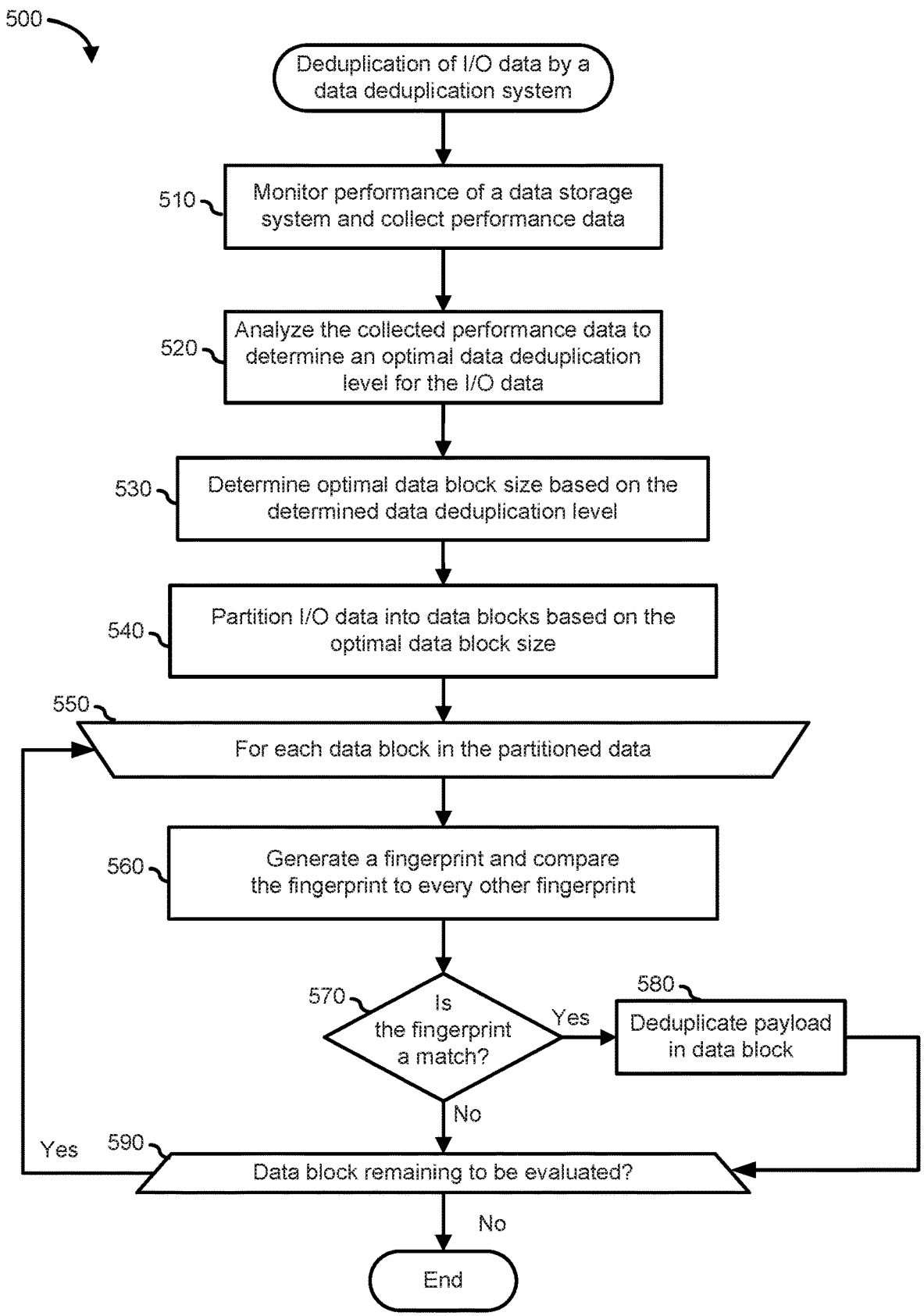
FIG. 5 is a flowchart illustrating a method of performing aspects of determining the optimal block size to partition the I/O data into fixed-length data blocks for data deduplication continued from FIG. 4 according to at least one embodiment of the present disclosure.

FIG. 5 shows a method 500 of performing data deduplication according to at least one embodiment of the present disclosure. Method 500 is a detailed illustration of block 420 of FIG. 4. In particular method 500 shows aspects of determining the optimal data block size to partition the I/O data into fixed-length data blocks for the data deduplication. Each step of method 500 or portions thereof may be performed by one or more suitable components of the data storage system 350 described above in relation to FIG. 3.

Method 500 typically begins at block 510 where the data storage system monitors the performance of network, devices, and/or resources and collects performance data. The performance data may be associated with usage of computing resources such as CPU utilization, graphics process unit (GPU) utilization, storage device utilization, a random-access memory (RAM) utilization, and other resource utilization data over a particular period of time. The CPU utilization may include a clock speed, that may include how often the clock speed is boosted to a higher speed, of the CPU during data deduplication and/or replication. The CPU utilization may also include a number of threads being executed, number of cores of the CPU, queue length, and other CPU utilization data. The GPU utilization may include GPU process unit utilization, graphics memory utilization, GPU temperature, GPU fan speed, and other graphics utilization metrics.

The collected performance data may be stored in a file, database, table, etc. This performance data may also serve as an input in determining the optimal data block size for the data deduplication. The performance data may be used to determine the performance metrics described and used in connection with the techniques herein. The performance data may be used in determining a workload for one or more physical devices, logical devices or volumes (LVs), thin devices or portions thereof, and the like. The workload may also be a measurement or level of "how busy" a device, or portion thereof is for example, in terms of I/O operations such as I/O throughput such as a number of I/O per second, and the like. After collecting the performance data, the method proceeds to block 520.

At block 520, the collected performance data are analyzed to determine the behavior of the network and the different components and/or resources of the data storage system. Performance data collected may include a number of I/O operations/unit of time such as I/O throughput from the back-end/DA perspective, and the like. The analysis may be performed by an analyzer executing on the deduplicating unit or another component of the data storage system to determine an optimal data block size for the data deduplication. The analysis may generate a graph such as a graph 610 of FIG. 6A to aid in the analysis. In addition, an evaluation table in addition to or instead of graph 610, such as table 630 of FIG. 6B may be generated. The method then proceeds to block 530.

At block 530, the method determines the optimal data block size to deduplicate the received I/O data based on the analysis in block 520. For example, based on the aforementioned analysis, the network behavior may be assigned a performance rank. The performance ranks may be determined based on the overall performance of the data storage system and its network. Performance ranking, which includes it ordering and number, may be pre-defined and ordered by an administrator or determined by the rules. For example, on a rank from one to ten, one may be defined as the worst data storage and/or network performance and ten as the best data storage and/or network performance. The method then proceeds to block 540. Similarly, the ordering and number of data deduplication levels and its mapping to the performance ranks may be determined by the administrator and/or by the rules. Finally, the size of the data blocks and its mapping to the data deduplication levels may be determined by the administrator and/or by the rules.

At block 540, the method partitions the I/O data into fixed-length data blocks equal to the optimal data block size. The partitioned data may be written in a data cache or buffer while being processed. The method proceeds to block 550. At block 550, each data block of the partitioned I/O data is traversed and processed. The data block being processed may be referred to as a current data block. The data storage system may monitor the position of each data block and identify whether the current data block is the last data block in the partitioned I/O data.

At block 560, a fingerprint is generated for each data block and compared to the fingerprint of every other data block to determine duplicates. A cryptographic hash function such as MD5, SHA-1, or SHA-256 is used to generates a fingerprint. The method proceeds to block 570. At block 570, if the fingerprint is a match or a duplicate of a fingerprint of another data block, then at block 580, the current data block being processed is deduplicated. Otherwise, the method proceeds to block 590. The deduplication is performed on identical data blocks by replacing every identical 512-byte data block with a unique first occurrence of the 512-byte data block. In addition, the metadata header associated with the block that includes the duplicate data payload is updated. At block 590, it is determined if there is a data block remaining to be evaluated. If there is a data block remaining to be evaluated, then the method proceeds to block 550 and traverses to the next data block. Otherwise, if there is no remaining data block to be evaluated, the method ends.

In other embodiments, various mechanisms may be performed to determine whether the current data block is a duplicate of a previous data block. For example, the data payload in the current data block may be compared to the data payload of each previous data block or each next block as determined by a defined order until the last data block has been compared to all other data blocks of the I/O data. Each data block with duplicate data payload is removed and replaced with a reference to the data block that has the first occurrence of the unique data payload.

Figures 6A, 6B:
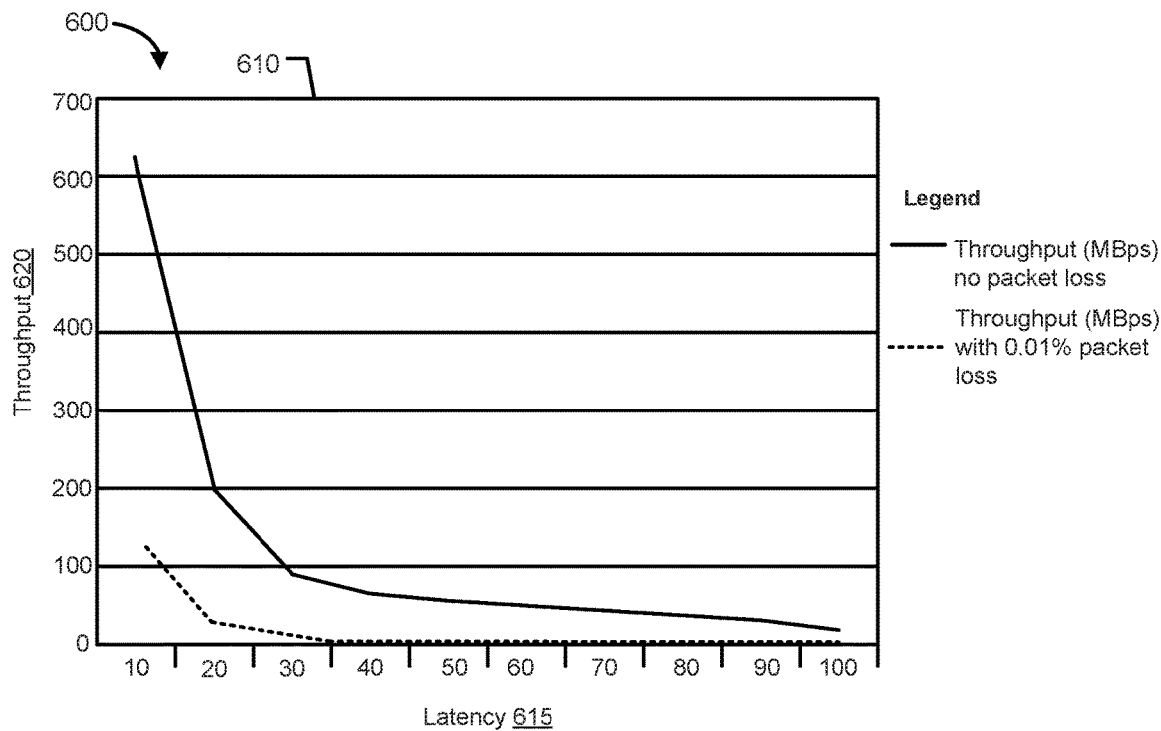
FIG. 6A is a graph showing an analysis of network behavior according to at least one embodiment of the present disclosure.
FIG. 6B is a table showing an evaluation based on the analysis in FIG. 6A of the network behavior according to at least one embodiment of the present disclosure.

FIG. 6A shows an example 600 with a graph 610 of real-time performance measurements and analysis and associated evaluation tables. Performance data used in the analysis may be collected from various components of the data storage system. Performance data may include MAC throughput and loss rate, lost packets, and retransmissions. Other embodiments of example 600 are possible and are intended to fall within the scope of the present disclosure.

Graph 610 is a plot that shows network latency and throughput of an example network. As used herein, "network throughput" refers to a window size divided by RTT. RTT refers to the time required for a signal pulse or packet to travel from a specific source to a specific destination and back again. The RTT may reflect the network delays present in the network. As used herein, "window size" is the maximum number of bytes that can be transmitted without being acknowledged as having been received by the other end or outstanding outbound data. As used herein, "congestion window size" is a limit by the sender on the amount of data that the sender can have in transit before receiving an acknowledgment (ACK) from the client. If the outstanding data is greater than a data send threshold, then the network is congested. Otherwise, there is network bandwidth available to send data without the network being congested.

To generate graph 610, network behavior of a data storage system with a replication pair may be observed. Throughput for different network latencies and packet loss for the replication pair was measured and plotted. For example, packet loss and re-transmissions are monitored for every time interval (T) and compared with a previous time interval (T−1) packet loss and retransmission values. If a difference in the re-transmissions between T and T−1 is greater than zero, then the network may be a lossy network. A lossy network allows for a frame drop within the network and relies on overlay protocols to handle the frame drop such as TCP/IP. In contrast, a lossless network does not allow a frame drop between an initiator and a target within the network.

Graph 610 includes latency in the X-axis and throughput in the Y axis. The latency as used in graph 610 is shown as increments of RTT in milliseconds. As shown, it may be observed that the throughput is reduced by more than half in the first 10-15 milliseconds of RTT delay. In addition, the throughput may be further worsened if there is a packet loss on the network. Based on these observations, one may conclude the following: first, if there is a packet loss in a particular network, the data sent to the particular network should be minimized to avoid retransmissions leading to increased congestion. Thus, a particular deduplication level that would minimize the data sent to the particular network should be chosen. Second, RTT vs throughput results indicates that the throughput is reduced by more than 50% for the first 10-15 milliseconds of RTT. Based on an analysis, the proposed approach may be to divide the scale 0 to 15 milliseconds RTT into four units to determine the optimal data deduplication level as shown in table 630, in particular, rows 660-675. If there is no packet loss or RTT, a default level of data deduplication, shown here as zero, may be chosen.

FIG. 6B shows a table 630 of example 600. Table 630 is an evaluation table based on graph 610 that may be used in determining the optimal data deduplication depth or level. Table 630 includes the following columns: a performance metric 635 column, a value 640 column, a rank 645 column, and a level 650 column. Table 630 also includes several rows. Each row may represent a category with its associated rank and level. In this example, a "packet loss and retransmissions 655" row, wherein its value is "retransmits are greater than retransmits threshold" is assigned a rank of 0 and a deduplication level of 1. An RTT 660 row, wherein its value is "RTT is greater than 0 milliseconds and less than 'A' milliseconds" is assigned a rank of 1 and a deduplication level of 4. An RTT 665 row, wherein the "RTT is greater than 'A' milliseconds and less than 'B' milliseconds" is assigned a rank of 2 and a deduplication level of 3. An RTT 670 row, with a value of "RTT is greater than 'B' milliseconds and less than 'C' milliseconds" is assigned a rank of 3 and a deduplication level of 2. An RTT 675 row, wherein the "RTT is greater than 'C' milliseconds" is assigned a rank of 4 and a deduplication level of 1. A "no packet loss and RTT is equal to zero 680" row, wherein the throughput is less than or equal to available bandwidth is assigned a rank of 5 and a deduplication level of 5. In this scenario, because there is no packet loss, it means that performance is good, so dividing the I/O data into bigger data chunks may be desirable, thus assigning the deduplication level of 5. In this example, we may assign 5 milliseconds to A, 10 milliseconds to B, and 15 milliseconds to C, based latency 615 on graph 610.

Generally, when there is a significant amount of network traffic, data deduplication using a non-optimal data block size such as data block size that is smaller than the optimal data block size may create many data blocks. This results in sluggish and delayed performance due to the number of data blocks to be processed, generating additional workload to the data storage system. Thus, ranking the network behavior a comparison of the states of the network may be achieved. Ranks may be assigned in the order wherein the lower the rank the worse the performance of the data storage system and/or the network. Conversely, the higher the rank, that is the better the performance of the data storage system and/or network. The ranks may be used to identify the optimal data deduplication levels from a set of data deduplication levels with varying data block sizes. In one embodiment, the rank order may be have a direct relationship to the deduplication level; that is the lower the rank, the lower the deduplication level and the higher the rank, the higher the deduplication level. In another embodiment, the rank order may have an inverse relationship to the deduplication level; that is the lower the rank, the higher the deduplication level and the higher the rank, the lower the deduplication level. In yet another embodiment, the rank order may have a direct relationship to the deduplication block size; that is the lower the rank, the smaller the optimal deduplication data block size, the higher the rank the bigger the optimal deduplication data block size. For example, when there is packet loss, that means the network may be having performance issues so smaller amount of data may be desirable to not clog the network further, thus a smaller data deduplication block size may be optimal. The rank order may be an inverse of the order of the deduplication block size. The lower the rank, the bigger deduplication data block size and greater the possibility to achieve a higher deduplication ratio. This may be achieved by a higher deduplication level that may translate to a bigger data block size. The higher the rank, the smaller the deduplication data block size and greater the possibility to achieve a lower deduplication ratio. This may be achieved by a lower deduplication level that may translate to a smaller data block size. The relationship between the rank, data deduplication level, and data deduplication block size may be determined by the machine learning algorithm or predefined by a user such as an administrator.

While table 630 illustrates a few entries, in practice, a table similar to table 630 may include hundreds, thousands, or even millions of entries detailing current network behavior. Table 630 may persist over time and may be used in generating current and/or future rules. The generated rules may be applied to the I/O data in determining the optimal data deduplication level. Table 630 may also be used to monitor changes in relationships between persisted performance data vs current performance data. Evaluation tables such as table 630 as shown can be encoded in the form of rules or policies that may be used to evaluate the performance data collected. An optimal data block size recommendation may be outputted based on these rules and policies. In another example, a training sample set used in generating graph 610 and table 630 may be converted into a decision tree with the performance metrics as attributes. In yet another example, an artificial neural network algorithm or incremental support vector machine (SVM) may be used to generate a decision model.

FIG. 7A shows an example 700 of a particular evaluation table and a deduplication table. Table 705 shows a generic example of table 630 of FIG. 6B. Other embodiments of I/O data and associated data structures, for example, variations of example 700, are possible and are intended to fall within the scope of the present disclosure.

Table 705 includes the following columns: a performance metric 710 column, a value 715 column, a rank 725 column, and a level 730 column. Table 705 also includes the following rows: a "performance category 1 735" row, a "performance category 2 740" row, a "performance category 2 745" row, a "performance category 2 750" row, a "performance category 2 755" row, and a "performance category 3 760" row. Performance category 1 735 row, wherein a "value is greater than a threshold" is assigned a rank of n−5 and a deduplication level 1. "Performance category 2 740" row, wherein value is "performance category 2 is greater than zero and less than x" is assigned a rank n−4 and a deduplication level n−1. "Performance category 2 745" row, wherein value is "performance category 2 is greater than x and less than y" is assigned a rank n−3 and a deduplication level n−2. "Performance category 2 750" row, wherein value is "performance category 2 is greater than y and less than z" is assigned a rank n−2 and a deduplication level n−3. "Performance category 2 755" row, wherein value is "performance category 2 is greater than z" is assigned a rank n−1 and a deduplication level n−4. "Performance category 3 760" row, wherein value is "A is less than or equal to B" is assigned a rank of n and a deduplication level of n. For Table 705, n is equal to 5.

In one embodiment, performance metrics may include storage access time. As used herein, "storage access time" refers to the time it takes to read data from hosts 100a-100n during a backup. "Storage access time" can also refer to the time it takes to read data from a storage device such as storage device 370 during a replication. In addition, "storage access time" may refer to the time it takes to write data to hosts 100a-100n during a restore from a storage device such as storage device 380. Finally, "storage access time" may refer to the time it takes to write data to storage devices such as storage device 370 and storage device 380. Access time is important because it directly impacts the amount of time required to perform a backup from a source storage to a target storage. Access time also impacts the amount of time required to perform a restore from the target storage to the hosts. In another embodiment, the performance metrics may further include data growth rate at data storage system 210. As used herein, the "data growth rate" refers to the rate at which the backup data is increasing at the hosts and/or the data storage system such as data storage system 210.

In another embodiment, the performance metrics include resource utilization. Resource utilization may include CPU utilization, target storage, I/O utilization, and network bandwidth utilization. As used herein, "CPU utilization" refers to the number of processing cycles that are used by the CPU. The CPU utilization data values may be provided as an average of the number of processing cycles used by the CPU. The CPU utilization may be provided as an average of the number of processing cycles utilization that is used by the CPU. The CPU utilization may be provided as an average of the number of processing cycles utilized over a predetermined time period. Thus, for example, 10% CPU utilization over an hour means that, on average, the CPU utilized 10% of its processing power during an hour. Alternatively, or in addition to, the CPU utilization may be presented as an average amount of time within a predetermined time period that the CPU is active or busy. Thus, for example, 10% CPU utilization over an hour means that, on average, the CPU is busy 10% during an hour or 6 minutes.

The performance metrics may also include a storage I/O. As used herein, the "storage I/O" refers to disc access. For example, each disc of data storage system 210 may be capable of 100 I/O accesses per second. In one embodiment, target storage I/O utilization may be presented as an average number of I/O accesses within a predetermined time period. Thus, in the above example, a 20% I/O utilization per second means that, on average, 20 I/O accesses out of 100 I/O accesses are used per second. In another embodiment, the performance metrics may also include data ingest rate. As used herein, "data ingest rate" refers to the amount of data that is flowing from a source storage such as hosts 102-102 to a target storage device such as storage device 370 over a predetermined time period.

Typically, in addition to performing a backup, data storage systems are performing one or more other background tasks which may be used as performance metrics. These background tasks may include garbage collection and/or data integrity check. As used herein, "garbage collection" refers to the deletion of data that is no longer active/referenced, thereby reclaimed unused space in the backup storage device. As used herein, "data integrity check" refers to the validation of whether backup data has been corrupted, for example, by computing a hash and comparing the computed hash against a hash that is stored on the disc. The data is considered corrupted if the hashes do not match. In one embodiment, the performance data measured/collected includes garbage collection time, that is time to complete the garbage collection and integrity check time, that is the time it takes to complete the integrity check.

In one embodiment, the performance metrics include data backup size. For instance, the data backup size can be the size of the backup data that are being stored at storage devices 370 and 380. In one embodiment, the performance metrics include the filesystem fragmentation statistics. As used herein, "fragmentation" refers to a phenomenon in which data are not contiguously location in storage. Filesystem fragmentation impairs backup and/or restore performance because data cannot be written to or from storage contiguously in an efficient manner. One having ordinary skill in the art would recognize that a system typically requires more time to access the same amount of data when data is scattered/fragmented throughout memory. The performance metrics described herein are for illustrative purposes, and not intended to be a limitation. One having ordinary skill in the art would recognize that other performance metrics can be used in the analysis.

FIG. 7B shows an example tabulation of deduplication levels and respective data block sizes of example 700. Data deduplication table 720 shows example data deduplication levels and a corresponding data block size. Data deduplication table 720 includes the following columns: level 760 column and block sizes 765 column. Level 760 column includes several deduplication levels. Block size 765 column includes several blocks sizes wherein each deduplication level has a respective block size. In an example, "data deduplication level 1" 770 may have a respective block size of 64 bytes. "Data deduplication level 2" 775 may have a respective block size of 128 bytes. "Data deduplication level 3" 780 may have a respective block size of 256 bytes. "Data deduplication level n−1" 785 may have a deduplication block size of 512 bytes. "Data deduplication level n" 790 has a respective block size of x bytes where x is greater than the data block size in deduplication level n−1. For example, X may be twice as big, for example 1024 bytes. Smaller and/or larger block sizes may be associated with the different deduplication levels. Relationships between block sizes and deduplication levels may be determined by the machine learning algorithm or pre-defined by a user such as an administrator.

It should be appreciated that the performance metrics, ranks, deduplication levels, data blocks sizes, and its mappings and/or associations are for illustrative purposes only and does not limit the current disclosure. Other variations may be used and fall within the current disclosure. For example, the number and/or order of the performance metrics, ranks, and/or deduplication levels may be determined automatically or pre-defined by an administrator. There may be more or less of the performance metrics, the ranks, the deduplication levels and/or the data block sizes to be used in the analysis that is shown in the current disclosure. Further, the ordering of the ranks may be ascending or descending as are the ordering of the deduplication levels. In the examples, a one to one mapping between the ranks and the deduplication levels is used. Other mapping variations may be used such as one to two or two to one. In addition, other block sizes may be associated with the deduplication levels. For example, instead of 64 bytes, the smallest data block size used in the table may be 32 bytes. Also, instead of 512 bytes, the largest data block size used in the table may be 1024 bytes.

Figure 8A:
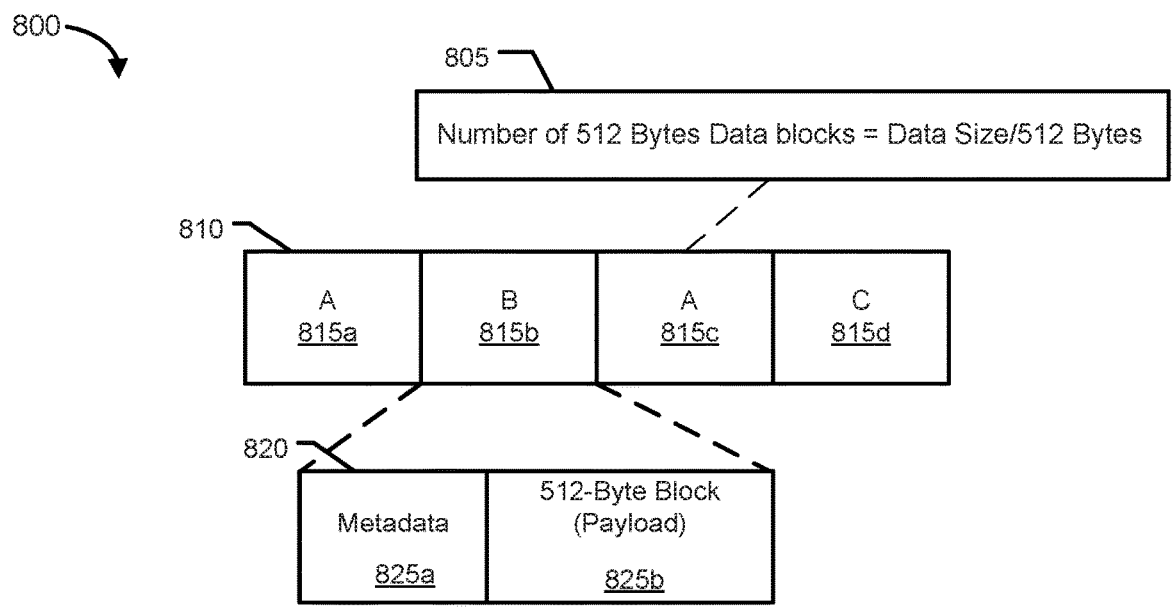
FIG. 8A shows an example of data blocks and associated data structures that may be used according to at least one embodiment of the present disclosure.

FIG. 8A shows an example 800 and associated data structures that may be used for the data deduplication. Other embodiments of the I/O data and the associated data structures, for example, variations of example 800, are possible and are intended to fall within the scope of the present disclosure. As mentioned earlier, the I/O data may be divided into one or more data blocks. Associated with each data block of I/O data may be metadata used to generally describe that particular data block. Metadata may include information such as a source index, a source offset, a source length, a destination offset, a destination length, and a number of deduplicated blocks.

For this example, as shown in table 630 of FIG. 6, assuming that the value of A is 5 and the RTT of the current disclosure is less than 0 and greater than 5, the rank may determined to be one and the deduplication level is 4. Assuming that n is equal to 5, the optimal data block size for this example is 512 bytes as shown in data deduplication table 720. Based on the aforementioned analysis, example 800 illustrates partitioned data 810 which is I/O data of a host-requested I/O operation that has been divided into 512-byte data blocks, each data block may be associated with its own metadata. In example 800, assuming the I/O data is 2048 bytes in size, the number of data blocks is equal to four based on a calculation 805. Data block 815a denotes a first data block and its associated block-level metadata, data block 815b denotes a second data block and its associated block-level metadata, data block 815c denotes a third data block and its associated block-level metadata, and data block 815d denotes a third data block and its associated metadata. It should be noted that the higher or greater the data deduplication level, higher the block size and lower possibility of data savings in comparison to the lower data deduplication levels.

Data block 820 illustrates data block 815b in more detail although each of the other data blocks of the partitioned data 810 may be similar to that as illustrated by data block 820. The data block 820 includes sections 825a and 825b. The section 825a includes metadata associated with section 825b. The section 825b includes a 512-byte data payload.

Figure 8B:
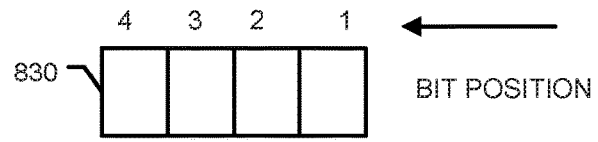
FIG. 8B shows an example of a metadata header associated with a partitioned I/O data that may be used according to at least one embodiment of the present disclosure.

FIG. 8B shows an example metadata header 830 associated with partitioned data 810. Typically, metadata headers may include one bit for each block of data in the I/O data. In this example, metadata header 830 includes a 4-bit vector array. Metadata header 830 includes a unique bit position for each of the possible four blocks for a single I/O operation. The bit positions are numbered one through three. In this illustration, the bit positions are from left to right (as depicted by an arrow). In another embodiment, the bit positions may be from right to left. The bit positions may include a value associated with each data block in the I/O data. The metadata header 830 includes a unique bit position for each of the possible four data blocks for a single I/O operation. The bit positions are numbered 1 through 4, inclusively, as denoted in connection with the metadata header 830. In this illustration, the bit positions are from left to right (as depicted by an arrow). In another embodiment, the bit positions may be from right to left. The bit positions may include a value associated with each data block in the I/O data. The value is zero if the data block is a unique instance of the I/O data payload. The value is one if the data block is a duplicate of a particular unique instance of the I/O data payload.

The first 512-byte block of 815*a* has a corresponding bit position one in metadata header 830. The second 512-byte block of 815*b* has a corresponding bit position 2 in the metadata header 830. The third 512-byte block of 815*c* has a corresponding bit position 3 in the metadata header 830. The fourth 512-byte block of 815*d* has a corresponding bit position 4 in the metadata header 830. Based on the foregoing, there is a defined ordering or position of the 512-byte blocks in the I/O data payload where such ordering or position of each of the blocks has a corresponding unique position in the metadata header 830.

Figure 8C:
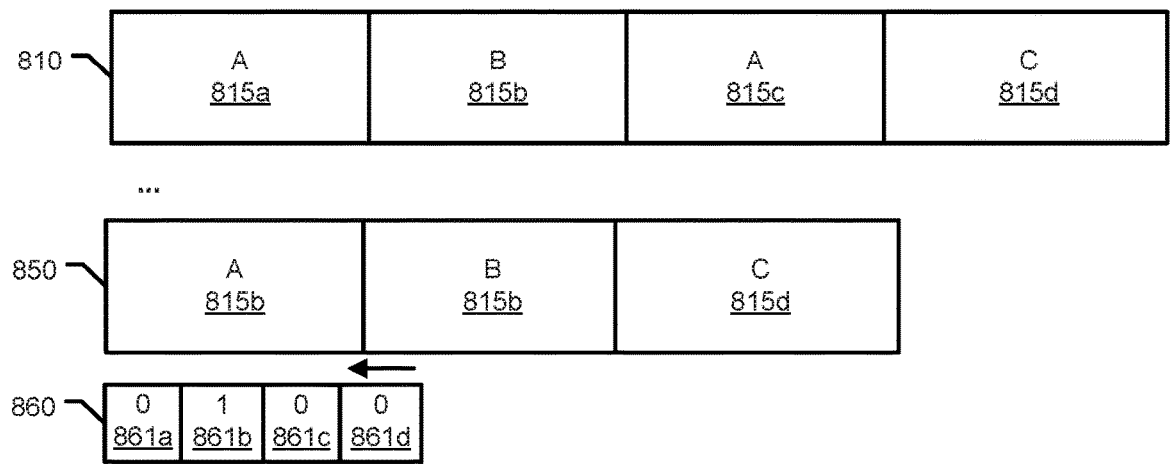
FIG. 8C shows an example of partitioned I/O data and associated data structures that may be used according to at least one embodiment of the present disclosure.

FIG. 8C shows partitioned data 810 and associated data structures of example 800. FIG. 8C also includes deduplicated data 850. Deduplicated data 850 is partitioned data 840 after it has been deduplicated. During the data deduplication process, data payloads of the different data blocks are compared. As shown, the data payload "A" in data block 841*c* is a duplicate of the payload "A" in data block 841*a*. If a particular data block is a duplicate of another data block, then metadata information associated with the duplicate data block may be updated with a reference. The reference is a pointer to the position of the first occurrence of the duplicate data block within the partitioned data. It should be appreciated that the data payload in the first data block in the partitioned data is always unique in the sense the first data block includes the first occurrence of a data payload. Prior to the data deduplication, metadata fields such as unique source index and operation code (not shown) of each data block may all be initialized to zero.

During the data deduplication, the data payload in data block 815*a* is retained because data block 815*a* is the first data block of partitioned data 810. The data payload "B" in data block 815*b* is compared with the data payload "A" in data block 815*a*. Because data payload "B" is not a duplicate of data payload "A," the process proceeds to the next data block 815*c*. Since data payload "A" in data block 815*c* is a duplicate of data payload "A" in data block 815*a*, data block 815*c* is deduplicated and the metadata respective to data block 815*c* may be updated.

Metadata header 860 includes fields 861*a* to 861*d* and shows metadata information for deduplicated data 850. Fields 861*a* to 861*d* indicates whether its respective data block has been deduplicated. Because field 861*d* which is respective to data block 841*a* has a value of zero, it indicates that data block 815*a* is unique and has not been deduplicated. Because field 861*c* which is respective to data block 815*b* has a value of zero, it indicates that data block 815*b* is unique and has not been deduplicated. Because field 861*b* which is respective to data block 815*c* has a value of one, it indicates that data block 815*c* has been deduplicated. Because field 861*a* which is respective to data block 815*a* has a value of zero, it indicates that data block 815*a* is unique and has not been deduplicated.

Figure 9:
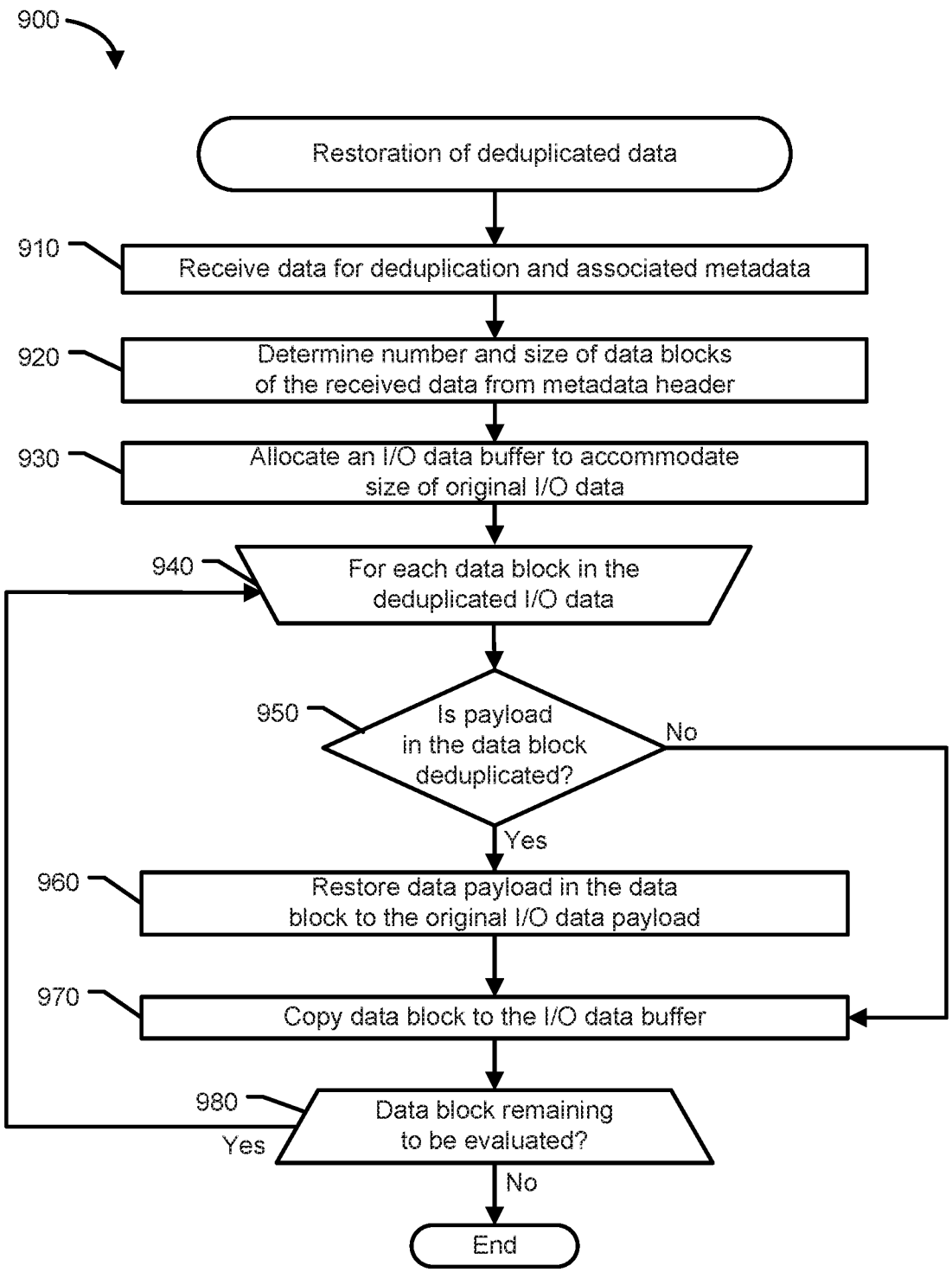
FIG. 9 is a flowchart illustrating an example of a method of restoring original I/O data from deduplicated I/O data according to at least one embodiment of the present disclosure.

FIG. 9 shows a method 900 for the restoration of deduplicated data by a data storage system. The method 900 may be performed by the data storage system or its components described in FIG. 3. At block 910, the data storage system receives the deduplicated data and associated metadata from a local or remote data storage subsystem. The associated metadata may include a metadata header and data block information. After receiving the deduplicated data and associated metadata, the method proceeds to block 920.

At block 920, the data storage system determines a number and size of data blocks from the metadata header. The data block size may be the optimal data block size used to partition the original I/O data. The data block size may be determined from a field chunk_size in the metadata. The number of data blocks may be determined from a field num_data_blocks of the metadata. The data storage system calculates the original size of the I/O data by multiplying the number of data blocks by the data block size. The method proceeds to block 930.

At block 930, after determining the original size of the I/O data, the data storage system allocates an I/O data buffer large enough to accommodate the size of the original I/O data. The method then proceeds to block 940. At block 940, the data storage system traverses the deduplicated data to evaluate and restore the data payload in the deduplicated data block to the original data payload. The data block that is currently being evaluated is herein referred to as the current data block. The method proceeds to block 950. At block 950, the data storage system determines whether the data payload of the current data block has been deduplicated. Determining whether the current data block has been deduplicated may include inspecting the field opcode of the metadata corresponding to the current data block. A value one of the opcode may indicate that the data payload of the current data block has been deduplicated. A value of zero of the opcode may indicate that data payload of the current data block has not been deduplicated, that is unique. If it is determined that the data payload of the current data block has been deduplicated then processing proceeds to a block 960. Otherwise, processing proceeds to a block 970.

At block 970, the data storage system determines the unique source index. The unique source index references the position of the unique data payload and copies the data payload to the current data block. The current data block with the restored data payload is copied to the I/O data buffer. In some embodiments, data blocks with unique data payloads are arranged in some particular order before any data blocks with duplicate data.

At a block 980, the data storage system determines if there is another data block remaining to be evaluated. If there is another data block remaining to be evaluated, the process proceeds with the next data block in block 940. Otherwise, the process may end. After completion of the method 900, the original I/O data may now be restored in the I/O buffer.

Figure 10:
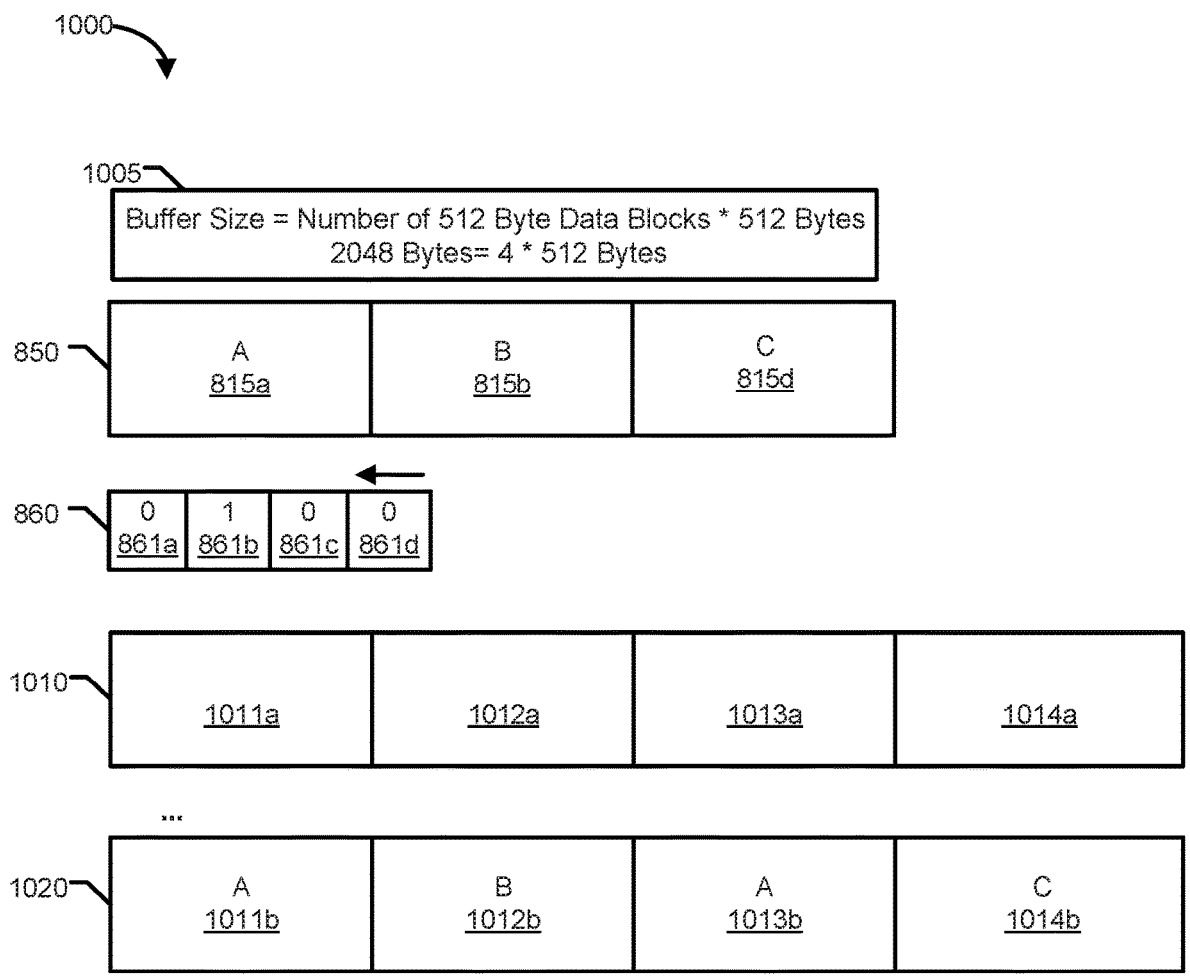
FIG. 10 shows an example of data restoration performed on deduplicated I/O data according to at least one embodiment of the present disclosure.

FIG. 10 shows an example 1000 of data restoration performed according to the method 900 of FIG. 9 on a deduplicated data 850 of FIG. 8C. The deduplicated data 850 shown may have been generated after partitioned data 810 of FIG. 8C was deduplicated according to method 500 of FIG. 5. Metadata header 860 associated with deduplicated data 850 is also shown. Metadata header 860 may be the updated version of metadata header 830. Metadata header 860 may have been stored in a different section of the memory from deduplicated data 850. A memory buffer 1010 of size 2048 bytes is generated. A calculation 1005 shows how 2048 bytes was computed. Memory buffer 1010 includes data blocks 1011*a*, 1012*a*, 1013*a*, and 1014*a*. Restored data 1020 shows memory buffer 1010 after deduplicated data 850 has been restored.

Deduplicated data 850 may be restored using method 900. The method traverses through each data block of the deduplicated data 850 to determine if a data block is deduplicated. Each data block in deduplicated data 850 has a corresponding field in metadata header 860. Metadata header includes fields 861*a* through 861*d*. If the field is equal to one, then the data block 915*c* is deduplicated. For example, because data block 841*a* is the first data block in the deduplicated data 850 and is not deduplicated, as shown in field 861*d*, the data storage system copies the data payload "A" to data block 1011*a* of memory buffer 1010. The data storage system determines if data block 841*b* is deduplicated. Because data block 841*b* is not deduplicated, as shown in field 861*c*, the data storage system copies the data payload "B" to the data block 1012*a* of memory buffer 1010. At this point, the data storage system determines whether data block 915*d* is deduplicated. The data storage system reads metadata header to determine if field associated with data block 841*d* is deduplicated. Otherwise, the data block 841*d* is not deduplicated and proceeds to copy the data payload to the buffer. In this example, because field 861*b* that is the next field after 861*c* has a value of 1 is associated with the third data block in the I/O data, the data storage system determines that the third data block in the I/O data is deduplicated because the value of field 861*b* is set to 1. The data storage system reads metadata such as unique source index associated with the third data block (not shown). The unique source index identifies the location of the first occurrence of the unique data payload in the original I/O data. In this example, the third data block has been deduplicated based on the payload of the first data block that is 841*a*. The data payload "A" in data block 841*a* is copied to data block 1013*a*. The data storage system proceeds to the next field in metadata header 860. Because the next field that is 861*a* is associated with data block 841*d* has a value of 0, then the payload "C" of 841*d* is copied to data block 1014*a* in memory buffer 1010. Restored data 1020 includes data block 1011*b*, data block 1012*b*, data block 1013*b*, and data block 1014*b*. Restored data 1020 shows memory buffer 1010 after the restoration of deduplicated data 850.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

For example, the systems and techniques described herein may use profiles to efficiently execute backup and/or storage of I/O data at the data storage system to be generated or identified by the data deduplication unit. The data storage system may include preset profiles that may be used to optimize the data block size during the data deduplication of the I/O data. The preset profiles may be configured to reduce memory usage, reduce storage usage, reduce storage latency, reduce network latency, reduce central processing unit (CPU) usage, increase response time, increase throughput, perform another type of optimization that enables the data storage system to execute more efficiently, or any combination thereof. The storage latency includes time between initiating a task and completing the task such as data storage, data deduplication, and data replication. Thus, the preset profiles may increase efficiency, reduce the data storage system's usage of computing resources and/or increase throughput and reduce response times of the software applications as compared to if the preset profiles were not used to configure the software and/or hardware of the computing device.

The preset profiles may be designed for specific I/O data types, network, and/or configuration of the data storage system. To create custom profiles for other I/O data types, network, and/or configuration of the data storage system such as those that are not addressed by the preset profiles and for types of usage of the data storage system for which the preset profiles were not designed, the monitoring unit may gather data within a predetermined or user-specified time interval regarding how the data storage system utilizes its computing resources. For example, the monitoring unit may continuously or at predetermined time intervals gather data over a particular period of time regarding how the data storage system utilize computing resources, such as, for example, CPU utilization (such as clock speed/boost, queue length, number of threads used, number of cores used, and other utilization parameters), graphics utilization (such as GPU utilization, graphics memory utilization, GPU temperature, GPU fan speed, and other graphics utilization parameters), storage usage (such as including temporary files and permanent files), memory utilization, another resource usage, or any combination thereof.

The method may determine if the performance data received is similar to (such as is within a predetermined amount of) stored performance data associated with a previously generated profile. Profiles may include information regarding the rank, deduplication level, and the optimal data block size which may be used during the data deduplication. If the current performance data is similar to the stored performance data, then the method uses the previously created profile. If the performance data is not similar to the stored performance data, then the method may perform an analysis of the performance data to generate a new profile. Comparing the performance data may include comparing resource usages such as number of cores used, number of hyper-threads used, queue length, cache usage, clock speed in terms of how often clock speed boost was used, RTT, network latency, throughput, storage usage, and the like. If the analyzer determines that the performance data is not similar to the stored performance data associated with the previously generated profile, then the method may generate a new profile. The analyzer may store the new profile with the other profiles.

While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method to improve efficiency of a data storage system, the method comprising:
   in response to detecting a triggering event that includes receiving input/output (I/O) data, by a hardware processor, collecting network performance metrics associated with the data storage system;
   analyzing the network performance metrics to determine network behavior using a rules-based machine learning algorithm;
   determining a first data block size by the rules-based machine learning algorithm based on a first performance rank;
   deduplicating the I/O data, wherein the deduplicating includes partitioning the I/O data into a first plurality of data blocks of the first data block size;
   determining a second data block size by the rules-based machine learning algorithm based on a second performance rank;
   deduplicating the I/O data, wherein the deduplicating includes partitioning the I/O data into a second plurality of data blocks of the second data block size, and wherein the second data block size is distinct from the first data block size; and
   generating a data deduplication table, wherein the data deduplication table includes the first data block size and the second data block size, wherein the first data block size is associated with a first data deduplication level and the second data block size is associated with a second data deduplication level.

2. The method of claim 1, further comprising generating rules for the rules-based machine learning algorithm based on the network performance metrics.

3. The method of claim 1, wherein the network performance metrics includes data associated with hardware and software components of the data storage system.

4. The method of claim 1, wherein the network performance metrics include round trip time, TCP/IP packet loss, and re-transmissions.

5. The method of claim 1, wherein a data deduplication level is an inverse of a performance rank.

6. The method of claim 1, further comprising generating a metadata header includes a bit for each block of data in the I/O data.

7. The method of claim 6, wherein the bit in the metadata header is used to indicate whether the I/O data is deduplicated.

8. The method of claim 7, wherein an ordering of data deduplication levels is an inverse of a particular ordering of performance ranks.

9. The method of claim 1, further comprising generating a fingerprint for each partitioned I/O data.

10. A data storage system configured to maintain data in a persistent storage subsystem, the data storage system comprising:
    a processor; and
    a memory having code stored thereon that, when executed by the processor, performs a method including:
      in response to detecting a triggering event that includes receiving input/output (I/O) data, collecting network performance metrics associated with the data storage system;
      analyzing the network performance metrics to determine network behavior by applying a rules-based machine learning algorithm;
      determining a first data block size by the rules-based machine learning algorithm based on a first performance rank;
      deduplicating the I/O data, wherein the deduplicating includes partitioning the I/O data into a first plurality of data blocks of the first data block size;
      determining a second data block size by the rules-based machine learning algorithm based on a second performance rank;
      deduplicating the I/O data, wherein the deduplicating includes partitioning the I/O data into a second plurality of data blocks of the second data block size, wherein the second data block size is distinct from the first data block size; and
      generating a data deduplication table, wherein the data deduplication table includes the first data block size and the second data block size, wherein the first data block size is associated with a first data deduplication level and the second data block size is associated with a second data deduplication level.

11. The data storage system of claim 10, wherein the memory having code stored thereon, when executed by the processor, performs the method further comprising generating rules based on the network performance metrics.

12. The data storage system of claim 10, wherein an ordering of data deduplication levels is an inverse of a particular ordering of performance ranks.

13. The data storage system of claim 10, wherein the memory having code stored thereon, when executed by the processor, performs the method further comprising generating a fingerprint for each partitioned I/O data.

14. The data storage system of claim 10, wherein the memory having code stored thereon, when executed by the processor, performs the method further comprising collecting the network performance metrics of hardware and software components of the data storage system.

15. A method of improving efficiency of a data storage system, the method comprising:
    in response to detecting a triggering event that includes receiving input/output (I/O) data, by a hardware processor, collecting network performance metrics associated with the data storage system;

analyzing the network performance metrics to determine network behavior using a rules-based machine learning algorithm;

determining first data block size by the rules-based machine learning algorithm based on a first performance rank;

determining a second performance rank based on the network behavior, wherein the second performance rank identifies a second data deduplication level that is mapped to the second performance rank; and determining a second data block size by the rules-based machine learning algorithm based on a second performance rank;

deduplicating the I/O data, wherein the deduplicating includes partitioning the I/O data into a second plurality of data blocks of the second data block size, and wherein the second data block size is distinct from the first data block size; and generating a data deduplication table, wherein the data deduplication table includes the first data block size and the second data block size, wherein the first data block size is associated with a first data deduplication level and the second data block size is associated with a second data deduplication level.

16. The method of claim 15, further comprising generating a metadata header includes a bit for each block of data.

17. The method of claim 15, wherein the network performance metrics includes data of hardware and software components of the data storage system.

18. The method of claim 15, further comprising deduplicating the I/O data based on the first data block size to produce a deduplicated I/O data.

19. The method of claim 15, wherein a deduplication level is an inverse of a performance rank.

20. The method of claim 15, further comprising partitioning the I/O data based on the first data block size into a plurality of data blocks.

* * * * *

UNITED STATES PATENT AND TRADEMARK OFFICE
CERTIFICATE OF CORRECTION

| | | |
|---|---|---|
| PATENT NO. | : 12,204,781 B2 | Page 1 of 1 |
| APPLICATION NO. | : 16/408919 | |
| DATED | : January 21, 2025 | |
| INVENTOR(S) | : Venkata L R Ippatapu | |

It is certified that error appears in the above-identified patent and that said Letters Patent is hereby corrected as shown below:

In the Claims

Column 29, Lines 7-10: Please delete "determining a second performance rank based on the network behavior, wherein the second performance rank identifies a second data deduplication level that is mapped to the second performance rank; and"

Column 30, Line 6: Please change "each block of data" to --each block of data in the I/O data--

Signed and Sealed this
Eighteenth Day of March, 2025

Coke Morgan Stewart
*Acting Director of the United States Patent and Trademark Office*